US008694742B2

(12) United States Patent
Inoue et al.

(10) Patent No.: US 8,694,742 B2
(45) Date of Patent: *Apr. 8, 2014

(54) STORAGE SYSTEM AND DATA MANAGEMENT METHOD FOR MIRRORING VOLUMES WITH ALLOCATE ON USE FUNCTION

(71) Applicant: Hitachi, Ltd., Tokyo (JP)

(72) Inventors: Shintaro Inoue, Odawara (JP); Yutaka Takata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/772,383

(22) Filed: Feb. 21, 2013

(65) Prior Publication Data

US 2013/0166841 A1 Jun. 27, 2013

Related U.S. Application Data

(63) Continuation of application No. 11/968,211, filed on Jan. 2, 2008, now Pat. No. 8,392,678.

(30) Foreign Application Priority Data

Jan. 25, 2007 (JP) .................................. 2007-015358

(51) Int. Cl.
*G06F 12/02* (2006.01)
(52) U.S. Cl.
USPC .......................................... 711/161; 711/173
(58) Field of Classification Search
USPC .................................. 711/161, 173
See application file for complete search history.

(56) References Cited

U.S. PATENT DOCUMENTS

| 5,615,352 A | 3/1997 | Jacobson et al. |
|---|---|---|
| 5,666,512 A | 9/1997 | Nelson et al. |
| 5,819,310 A | 10/1998 | Vishlitzky et al. |
| 7,386,694 B1 | 6/2008 | Bezbaruah et al. |
| 7,539,991 B2 | 5/2009 | Leong et al. |
| 2003/0204671 A1 | 10/2003 | Matsunami et al. |
| 2005/0015694 A1* | 1/2005 | Hetzler et al. ................ 714/752 |
| 2006/0242378 A1 | 10/2006 | Kano |
| 2008/0183964 A1 | 7/2008 | Inoue et al. |

FOREIGN PATENT DOCUMENTS

WO 2004104845 2/2004

* cited by examiner

*Primary Examiner* — Jared Rutz
(74) *Attorney, Agent, or Firm* — Brundidge & Stanger, P.C.

(57) ABSTRACT

A storage system and data management method is provided that improves the reliability and fault tolerance of the hard disks saving data utilizing an AOU function. A storage system comprises a first correlating section for correlating a plurality of RAID groups composed of a plurality of physical disks, and the pool region, a second correlating section for correlating the pool region and the storage regions of the virtual volumes, a first allocation section for allocating first data from the host apparatus to the first storage region of the first RAID group based on write requests from the host apparatus, and a second allocation section for distributing second data from the host apparatus at and allocating the second data to any storage regions of the RAID group, with the exception of the first storage region of the first RAID group allocated by the first allocation section, based on write requests.

10 Claims, 42 Drawing Sheets

FIG.6

| HOST VOLUME NUMBER (90A) | BASE VOLUME NUMBER (90B) | MIRROR VOLUME NUMBER (90C) |
|---|---|---|
| 0 | 1 | 2 |
| 3 | FFFF | FFFF |

| VIRTUAL VOLUME NUMBER (91A) | POOL ID (91B) | PREVIOUSLY ALLOCATED ECC GROUP INDEX NUMBER (91C) |
|---|---|---|
| 1 | 0 | FFFF |
| 2 | 0 | FFFF |
| 4 | FFFF | FFFF |
| 5 | FFFF | FFFF |

| PAGE NUMBER (VIRTUAL VOLUME 1) 92A | ECC GROUP NUMBER 92B | PAGE NUMBERS WITHIN AN ECC GROUP 92C |
|---|---|---|
| 0 | FFFF | FFFF |
| 1 | FFFF | FFFF |
| 2 | FFFF | FFFF |

| PAGE NUMBER (VIRTUAL VOLUME 2) 92A | ECC GROUP NUMBER 92B | PAGE NUMBERS WITHIN AN ECC GROUP 92C |
|---|---|---|
| 0 | FFFF | FFFF |
| 1 | FFFF | FFFF |
| 2 | FFFF | FFFF |

| POOL ID | ECC GROUP NUMBER |
|---------|------------------|
| 0 | 3 |
| 1 | 4 |
| 2 | 2 |

| 94A | 94B | 94C | 94D | 94E | 94F |
|---|---|---|---|---|---|
| ECC GROUP INDEX NUMBER FOR WITHIN A POOL | ECC GROUP NUMBER | NEXT ALLOCATED PAGE NUMBER | PAGE TOTAL | NUMBER OF PAGES USED | STATUS |
| 0 | 1 | 0 | 200 | 1 | NORMAL |
| 1 | 3 | 0 | 150 | 0 | NORMAL |
| 2 | 2 | 0 | 130 | 0 | NORMAL |

94

PREVIOUSLY ALLOCATED ECC GROUP →
ORDER OF ECC GROUP ALLOCATED THIS TIME 1 →
ORDER OF ECC GROUP ALLOCATED THIS TIME 2 →

FIG.19

| ECC GROUP INDEX NUMBER FOR WITHIN A POOL | ECC GROUP NUMBER | NEXT ALLOCATED PAGE NUMBER | PAGE TOTAL | NUMBER OF PAGES USED | STATUS |
|---|---|---|---|---|---|
| 0 | 1 | 1 | 200 | 1 | FAULT |
| 1 | 3 | 0 | 150 | 0 | NORMAL |
| 2 | 2 | 0 | 130 | 0 | NORMAL |

94A / 94B / 94C / 94D / 94E / 94F

94

STORAGE SYSTEM AND DATA MANAGEMENT METHOD FOR MIRRORING VOLUMES WITH ALLOCATE ON USE FUNCTION

CROSS-REFERENCE TO RELATED APPLICATIONS

The present application is a continuation of application Ser. No. 11/968,211, filed Jan. 2, 2008, now U.S. Pat. No. 8,392,678; which relates to and claims priority from Japanese Patent Application No. 2007-015358, filed on Jan. 25, 2007, the entire disclosure of which is incorporated herein by reference.

BACKGROUND OF THE INVENTION

1. Field of the Invention

The present invention relates to a storage system and data management method that is particularly appropriate for application to storage systems ensuring reliability and fault tolerance for stored data.

2. Description of Related Art

In the related art, a method of managing a plurality of hard disks using a RAID (Redundant Array of Independent/Inexpensive Disks) exists for storage systems managing data using storage apparatus. At least one or more logical volumes (hereinafter referred to as "logical volumes") are formed on a physical storage region provided by a large number of hard disks.

Of the RAID methods, for example, a method referred to as RAID1 exists to ensure that data is not lost from the host apparatus even if one hard disk fails. In this method, the host apparatus accesses one virtual logical volume (hereinafter referred to as "virtual volume") but in reality adopts a method where the same data is stored on respective hard disks constituted by two hard disks. According to this method, it is possible to ensure data redundancy.

Further, other technology for providing data redundancy is disclosed in patent document 1 where technology is provided where a module is equipped with a plurality of data storage sections comprised of slice regions formed in advance in order to store sliced data, a management information storage section for managing the slice regions, and a communication function section for communicating sliced data stored in the data storage sections and management information for storing within the management information section.

On the other hand, technology referred to as a so-called AOU (Allocation On Use) function where virtual volumes are supplied to a host apparatus without making logical volumes of fixed capacities from storage regions of a hard disk and where storage regions of a hard disk are dynamically allocated to virtual volumes according to requests from the host apparatus is also proposed. According to technology using this AOU function, it is possible to dynamically extend the capacity of a virtual volume.

PATENT DOCUMENT 1

International publication pamphlet number 2004/104845

However, with the RAID 1 method referred to as mirroring, two hard disks are written to at the same time when data is written to a virtual volume. This means that the hard disk of the smaller capacity has to be catered for in the event that the capacity of the two hard disks is different.

Further, on the other hand, in the event that a fault occurs where functioning as a RAID group no longer takes place, with a storage system that does not utilize an AOU function, it is no longer possible to use logical volumes belonging to this group, but with storage systems utilizing an AOU function, it is no longer possible to use virtual volumes where regions are allocated from the RAID group. There is therefore the problem that storage systems utilizing an AOU function exert substantial influence on the system as a whole compared with storage systems that do not utilize and AOU function.

The present invention therefore sets out to provide a storage system and data management method that utilizes an AOU function and improves reliability and fault tolerance of a hard disk saving data.

SUMMARY OF THE INVENTION

In order to resolve these problems, in an aspect of the present invention, a storage system allocating some or all of storage regions supplied by physical disks storing data from host apparatus as a pool region, and forming virtual volumes dynamically allocated from the pool regions comprises a first correlating section for correlating a plurality of RAID groups composed of a plurality of physical disks, and the pool region, a second correlating section for correlating the pool region and the storage regions of the virtual volumes, a first allocation section for allocating first data from the host apparatus to the first storage region of the first RAID group based on write requests from the host apparatus, and a second allocation section for distributing second data from the host apparatus at and allocating the second data to any storage regions of the RAID group, with the exception of the first storage region of the first RAID group allocated by the first allocation section, based on write requests from the host apparatus.

As a result, it is possible to dynamically provide virtual volumes correlated in order to store requested data from a physical disk based on write requests of host apparatus, and it is possible to distribute consecutive data from the host apparatus to a plurality of RAID groups for storage.

Further, in the present invention, a data management method for a storage system allocating some or all of storage regions supplied by physical disks storing data from host apparatus as a pool region, and forming virtual volumes dynamically allocated from the pool regions comprises a first correlation step of correlating a plurality of RAID groups composed of a plurality of the physical disks, and the pool region, a second correlation step of correlating the pool region and the storage regions of the virtual volumes, a first allocation step of allocating first data from the host apparatus to the first storage region of the first RAID group based on write requests from the host apparatus, and a second allocation step of distributing second data from the host apparatus at and allocating the second data to any storage regions of the RAID group, with the exception of the first storage region of the first RAID group allocated in the first allocation step, based on write requests from the host apparatus.

As a result, it is possible to dynamically provide virtual volumes correlated in order to store requested data from a physical disk based on write requests of host apparatus, and it is possible to distribute consecutive data from the host apparatus to a plurality of RAID groups for storage.

According to the present invention, by utilizing an AOU function, it is possible to improve the reliability and fault tolerance of hard disks saving data.

Other aspects and advantages of the invention will be apparent from the following description and the appended claims.

BRIEF DESCRIPTION OF THE DRAWINGS

FIG. 6 is a schematic showing configuration information for the host volume of the first embodiment;

FIG. 7 is a schematic showing configuration information for the virtual volume and the pool volume of the first embodiment;

FIG. 8(A) and FIG. 8(B) are schematic showing configuration information for a virtual volume of the first embodiment;

FIG. 9 is a schematic showing configuration information for a pool volume of the first embodiment;

FIG. 17 is a schematic view illustrating allocation and deciding processing of a channel adapter of the first embodiment;

FIG. 19 is a schematic view illustrating fault processing of a disk adapter of the first embodiment;

DETAILED DESCRIPTION OF PREFERRED EMBODIMENTS

The following is a description with reference to the drawings below of a first embodiment of the present invention.

Figure 1:
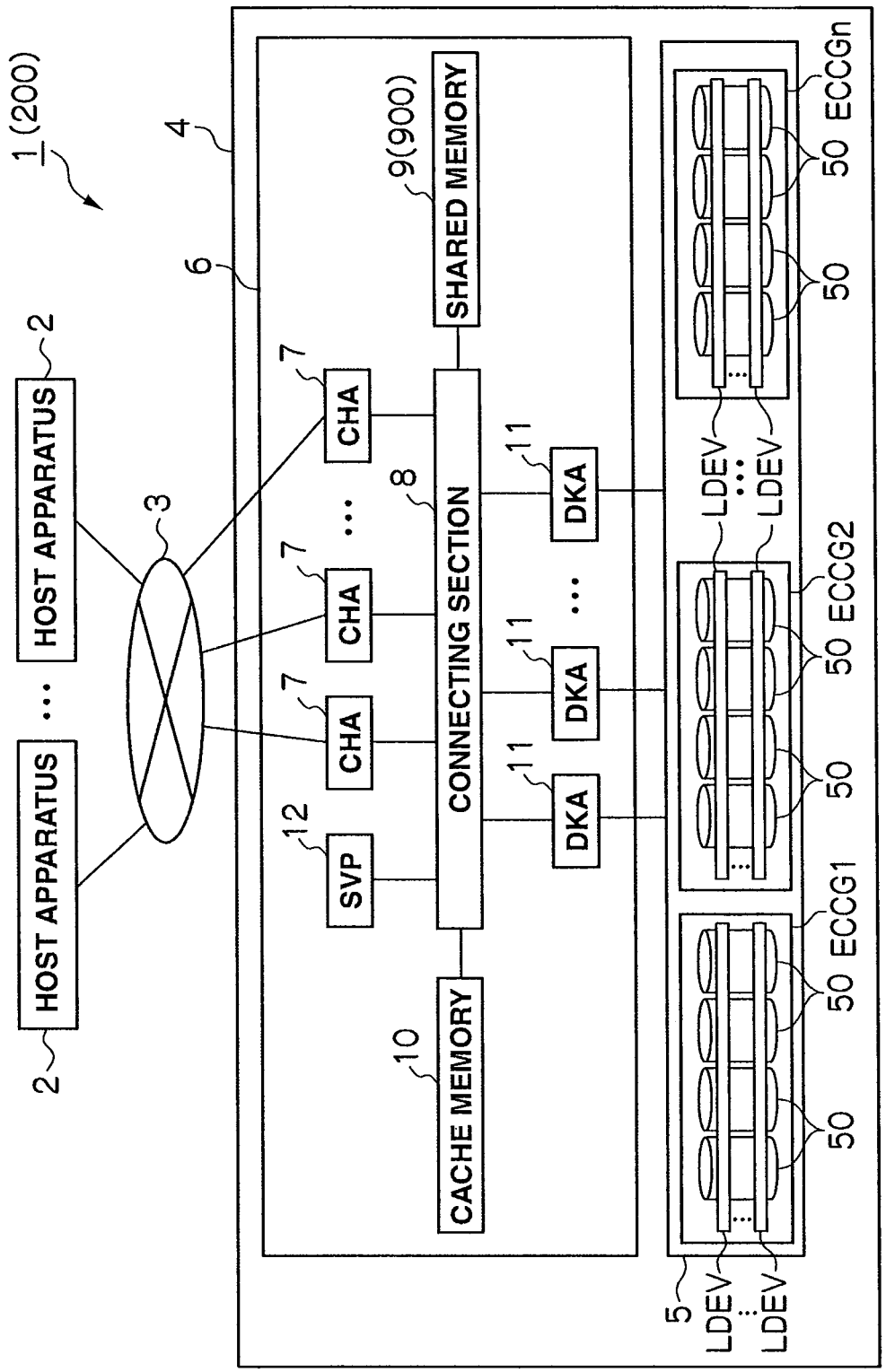
FIG. 1 is a block view showing an overall configuration for a storage system of a first embodiment.

(1) First Embodiment (1-1) Configuration of Storage System of the First Embodiment In FIG. 1, numeral 1 is the whole of a storage system of this embodiment. This storage system 1 is configured from host apparatus 2 connected to storage apparatus 4 via a network 3.

The host apparatus 2 is computer apparatus equipped with information processing resources such as a CPU (Central Processing Unit) and memory etc., and is configured from, for example, a personal computer, workstation, and mainframe, etc. Further, the host apparatus 2 has information input apparatus (not shown) such as a keyboard, switches and pointing apparatus, and microphone etc., and also has information output apparatus (not shown) such as a monitor display and speakers etc.

The network 3 is configured from, for example, a SAN (Storage Area Network), LAN (Local Area Network), Internet, public line, or dedicated line, etc. In the event that, for example, the network 3 is a SAN, communication between host apparatus 2 and storage apparatus 4 via this first network 3 is carried out in accordance with a fiber channel protocol, and in the event that the first network 3 is a LAN, communication is carried out in accordance with TCP/IP (Transmission Control Protocol/Internet Protocol).

Storage apparatus 4 is comprised of a disk section 5 comprised of a plurality of hard disks 50, and a controller 6 managing the plurality of hard disks 50 using the RAID method.

The hard disks 50 are constituted by, for example, expensive disks such as SCSI (Small Computer System Interface) disks etc., or low-cost disks such as SATA (Serial AT Attachment) disks and optical disks, etc.

The controller 6 is equipped with a plurality of channel adapters 7, a connecting section 8, shared memory 9, cache memory 10, and a plurality of disk adapters 11, and a service processor 12.

Each channel adapter 7 is configured from a microcomputer system equipped with a microprocessor (not shown), memory (not shown), and communication interface etc., and a port for connecting the network 3 (not shown). Each channel adapter 7 interprets each command sent from host apparatus 2 and executes the necessary processing. Network addresses (for example, IP addresses, WWN) for providing identification are allocated to the ports of each channel adapter 7, so that it is possible for a channel adapter 7 to behave individually as NAS (Network Attached Storage).

Figure 2:
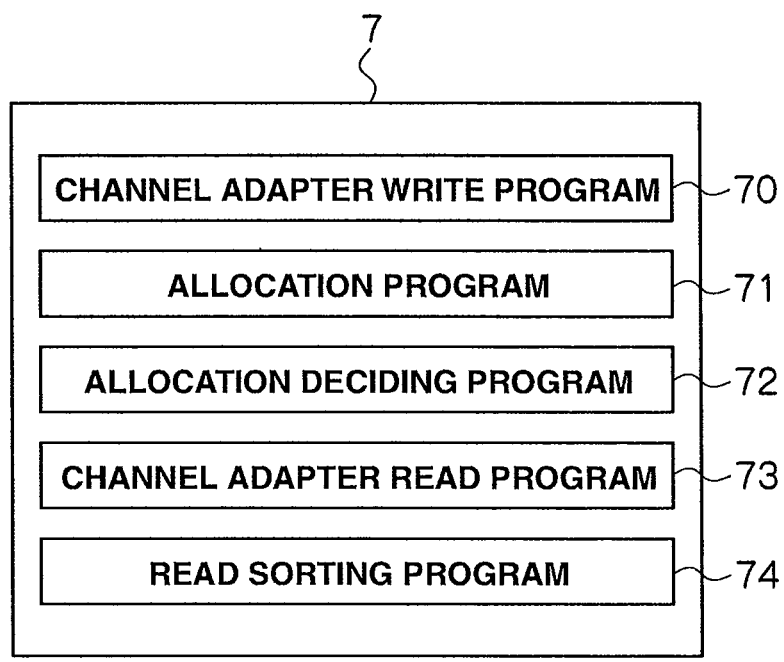
FIG. 2 is a schematic showing in a channel adapter of the first embodiment.

As shown in FIG. 2, memory of each channel adapter 7 is equipped with a write program 70 for use with channel adapter 7 managing write requests from host apparatus 2, allocation program 71 for allocating data from host apparatus to storage regions within the hard disks 50, deciding program 72 for allocating to storage regions within the hard disks 50 and deciding upon data from the host apparatus 2, a read program 73 for use with channel adapter 7 for processing read requests from the host apparatus 2, and a read sorting program 74 for sorting a plurality of read out data in such a manner as to read out from different virtual volumes. Each channel adapter 7 is connected with connecting section 8 via an internal bus adapter (not shown).

In addition to the channel adapter 7 described above, connecting section 8 is connected to shared memory 9, cache memory 10 and disk adapters 11. The exchange of data and commands with the channel adapters 7, shared memory 9, cache memory 10 and disk adapters 11 is carried out via this connecting section 8. The connecting section 8 is configured from a switch such as, for example, an ultra-high-speed cross-bus switch for transferring data using high-speed switching, or bus etc.

The shared memory 9 is storage memory shared by the channel adapters 7 and disk adapters 11. The shared memory 9 is mainly utilized for storing system configuration information read from system volumes at the time of turning on a power supply for storage apparatus 4 and various control programs, as well as commands etc. from host apparatus 2. Various configuration information stored in shared memory 9 is described in the following.

The cache memory 10 is storage memory shared by the channel adapters 7 and disk adapters 11. This cache memory 10 is mainly utilized to temporarily store user data inputted to and outputted from storage apparatus 4.

Each disk adapter 11 is configured as a microcomputer system equipped with a microprocessor (not shown) and memory (not shown) etc. and functions as an interface for carrying out protocol control at the time of communication with the disk section 5. These disk adapters 11 are connected to corresponding disk devices 61 via, for example, a fiber channel cable, and exchange data with the disk section 5 in accordance with a fiber channel protocol.

Figure 3:
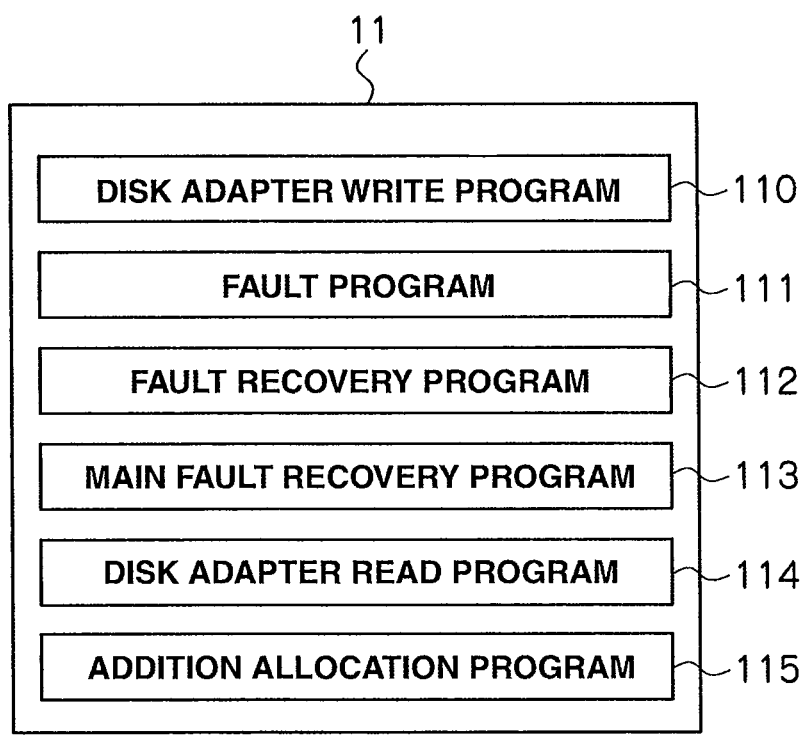
FIG. 3 is a schematic showing in a disk adapter of the first embodiment.

As shown in FIG. 3, a write program 110 for disk adapter use for processing write requests from the host apparatus 2, a fault program 111 for processing hard disks 50 of the plurality of hard disks 50 from where faults occur, a fault recovery program 112 for recovering storage regions of the hard disks 50 where faults occur, a main fault recovery program 113, a disk adapter read program 114 for processing read requests from the host apparatus 2, and an addition allocation program 115 for allocating to storage regions of added hard disks 50 are provided in the memory of each disk adapter 11.

The service processor 12 is computer apparatus operated in order to maintain and manage the storage apparatus 4 and is, for example, configured from a note-type personal computer. At this service processor 12, the host apparatus 2 is connected via the network 3, and is capable of receiving data or instructions from the host apparatus 2. The service processor 12 monitors the occurrence of faults within the storage apparatus 4 and displays these faults on a display screen (not shown).

(1-1-2) Logical Configuration for Storage System

Next, a description is given of a logical configuration for the storage system 1 described above.

The storage system 1 of this embodiment takes four hard disks 50 of the plurality of hard disks 50 as one ECC (Error Correcting Code) group. One or a plurality of logical volumes LDEV are then defined on a storage region provided by one ECC group. An ECC group and a RAID group are defined in this embodiment.

Of each logical volume LDEV, characteristic identifiers (LUN: Logical Unit Number) are allocated to logical volumes LDEV designated by the user, of each of the logical volumes LDEV. In the case of this embodiment, the input and output of data is carried out by taking a combination of this identifier and a unique block number (LBA: Logical Block Address) allocated to each logical block as an address, and designating this address.

Here, real volumes VOL and virtual volumes VVOL exist as attributes for the logical volumes LDEV.

Figure 4:
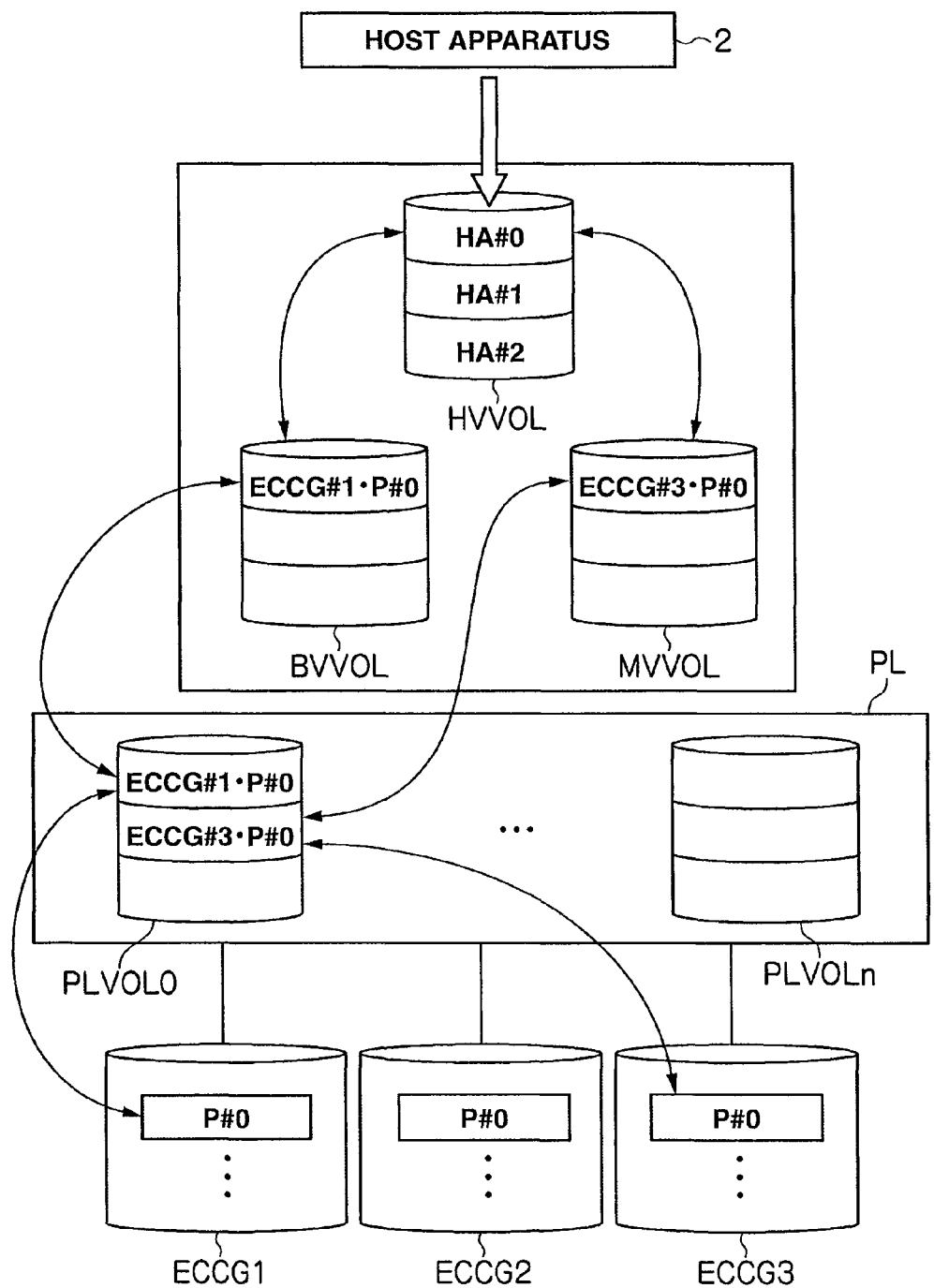
FIG. 4 is an outline view showing a logical configuration for a storage system of the first embodiment.

Of the plurality of real volumes, pool volume PLVOL exists as the real volume used in mapping with the virtual volumes. For example, FIG. 4 is an outline view showing a logical relationship between the host apparatus 2 and the plurality of hard disk drives 50 of the storage system 1. One pool volume PLVOL may be constituted by one ECC group, or a plurality of pool volumes PLVOL may be constituted by one ECC group.

A plurality of pool volumes PLVOL may also form one pool region PL. A pool volume PLVOL may be dynamically allocated with a storage region of the hard disks 50 so as to supply a storage region for a virtual volume VVOL.

A virtual volume VVOL is constituted by a host volume HVVOL accessed by the host apparatus 2, a base volume BVVOL constituting the host volume HVVOL, and host volume HVVOL, so as to give a mirror volume MVVOL constituting a mirror configuration with the base volume BVVOL.

Minimum storage regions referred to as pages P that can be allocated with an ECC group are correlated at storage regions of base volumes BVVOL or mirror volumes MVVOL. For example, in FIG. 4, storage regions within base volume BVVOL or mirror volume MVVOL are made to correlate with respective pages P0 within the ECC group 1 or ECC group 3 via pool volume PLVOLO.

(1-2) Distributed Storage Function, Mirror Function, and AOU Function of this Embodiment Next, a description is given of a distributed storage function, mirror function, and AOU function mounted on the storage apparatus 4 within the storage system 1.

A feature of this storage system 1 is to be able to decide to store data from the host apparatus 2 within an arbitrary ECC group based on write requests from the host apparatus 2, and to be able to distribute storage locations in such a manner that back-up data is stored in ECC groups other than the ECC groups storing the data.

Here, "distributed storage function" refers to a function for storing consecutive data in a manner distributed between a plurality of ECC groups in the event that there is consecutive data based on write requests from the host apparatus 2. For example, this refers to a function where, in the event that there is consecutive data 1 to data 3, when data 1 is stored in a storage region of ECC group 1, data 2 is stored in a storage region outside of that storing the data 1, and data 3 is stored in a storage region other than the storage regions storing data 1 and data 2. There are therefore cases where the consecutive data 1 to data 3 is stored in the same ECC group or in different ECC groups.

Further, a mirror function refers to a function based on a RAID 1 mirror configuration. The mirror function is configured from a base volume BVVOL and a mirror volume MVVOL.

Moreover, an AOU function refers to a function of dynamically allocating storage regions to base volumes BVVOL and mirror volumes MVVOL from pool regions PL or pool volumes PLVOL comprised of ECC group storage regions.

(1-2-1) Configuration Information in Shared Memory

In order to implement the functions described above, a description is given of the shared memory 9 of the storage apparatus 4.

Figure 5:
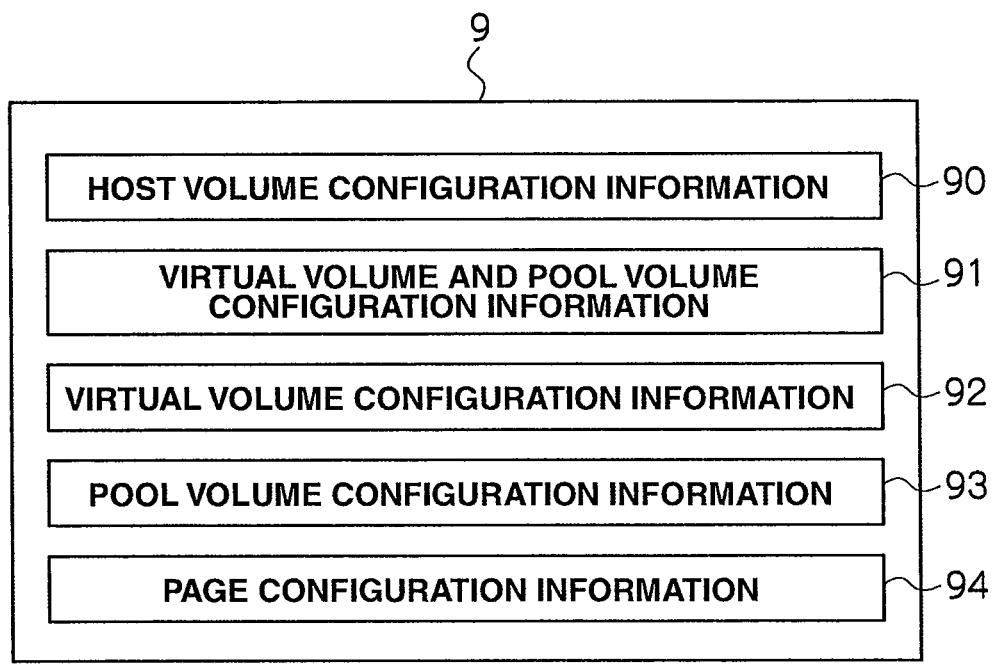
FIG. 5 is a schematic showing in shared memory of the first embodiment.

At the shared memory 9, as shown in FIG. 5, host volume configuration information 90, virtual volume and pool volume configuration information 91, virtual volume configuration information 92, pool volume configuration information 93, and page configuration information 94 are provided.

(1-2-1-1) Host Volume Configuration Information

As shown in FIG. 6, host volume configuration information 90 is configuration information for host volumes HVVOL recognized by the host apparatus 2, base volumes BVVOL and mirror volumes MVVOL within the storage apparatus 4 correlated with the volumes.

The host volume configuration information 90 is configured from a "host volume number" field 90A, a "base volume number" field 90B, and a "mirror volume number" field 90C.

Host volume numbers for the host volumes HVVOL accessed by the host apparatus 2 are stored in the "host volume number" field 90A.

Volume numbers for base volumes BVVOL are stored in the "base volume number" field 90B. Similarly, volume numbers for mirror volumes MVVOL are stored in the "mirror volume number" field 90C.

For example, as shown in FIG. 6, a host volume of a "volume number" of "0" is constituted by a base volume of a "base volume number" of "1" and a mirror volume of a "mirror volume number" of "2". Here, "FFFF" indicates volumes that have yet to be allocated or have not yet been used.

(1-2-1-2) Configuration Information for Virtual Volumes and Pool Volumes

Virtual volume VVOL and pool volume PLVOL configuration information 91 stores information indicating the correlation of pool volume PLVOL and virtual volume VVOL, as shown in FIG. 7.

Virtual volume and pool volume configuration information 91 is configured from a "virtual volume number" field 91A, a "pool ID" field 91B, and a "previously allocated ECC group index number" field 91C.

Information for numbers for virtual volumes constituting the base volumes BVVOL and mirror volumes MVVOL is stored in the "virtual volume number" field 91A.

Identification numbers for pool volumes PLVOL are stored in the "pool ID" field 91B. Specifically, pool ID's correlating virtual volume numbers for base volumes BVVOL or mirror volumes MVVOL are stored.

Index numbers for ECC groups storing data for the previous time are stored in "previously allocated ECC group index number" field 91C. The ECC group index number is described using page configuration information 94.

(1-2-1-3) Virtual Volume Configuration Information

As shown in FIG. 8, the virtual volume configuration information 92 is configuration information provided every virtual volume number assigned to a base volume BVVOL and mirror volume MVVOL, and stores information indicating the relationship between the minimum storage region allocated to the virtual volume and the ECC groups correlated to the storage regions.

Virtual volume configuration information 92 is configured from a "page number" field 92A, "ECC group number" field 92B, and "page numbers within an ECC group" field 92C.

Page numbers for pages (storage regions), a plurality of which are formed within a single virtual volume, are stored in the "page number" field 92A.

ECC group numbers correlated to page numbers formed within a signal virtual volume are stored in the "ECC group number" field 92B.

Page numbers for ECC group numbers correlated with page numbers formed within a single virtual volume are stored in the "page numbers within an ECC group" field 92C.

(1-2-1-4) Pool Volume Configuration Information

Figure 9:
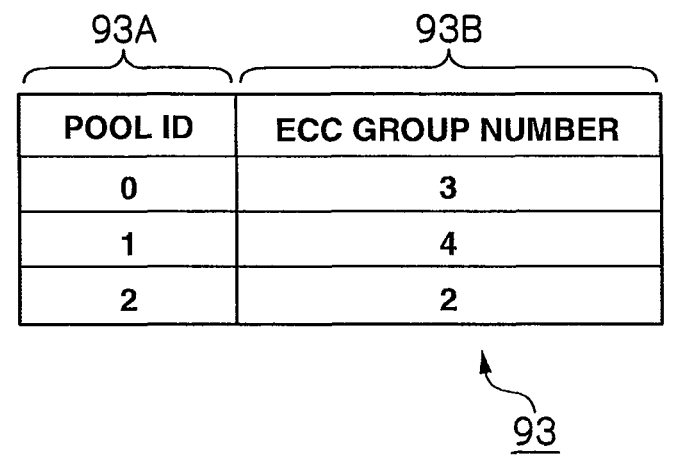

As shown in FIG. 9, pool volume configuration information 93 stores information indicating the number of ECC groups that are correlated with pool volume PLVOL. The configuration information 93 for the pool volume PLVOL is configured from "pool ID" field 93A and "ECC group number" field 93B.

Identification numbers for pool volumes PLVOL are stored in the "pool ID" field 93A.

Pool volumes PLVOL are correlated with the "ECC group number" field 93B, and the number of ECC groups under the control of the pool volume PLVOL are stored in "ECC group number" field 93B.

For example, as shown in FIG. 9, it is shown that ECC group "3" is under control at the pool volume PLVOL of "pool ID" of "0".

(1-2-1-5) Page Configuration Information

Figure 10:
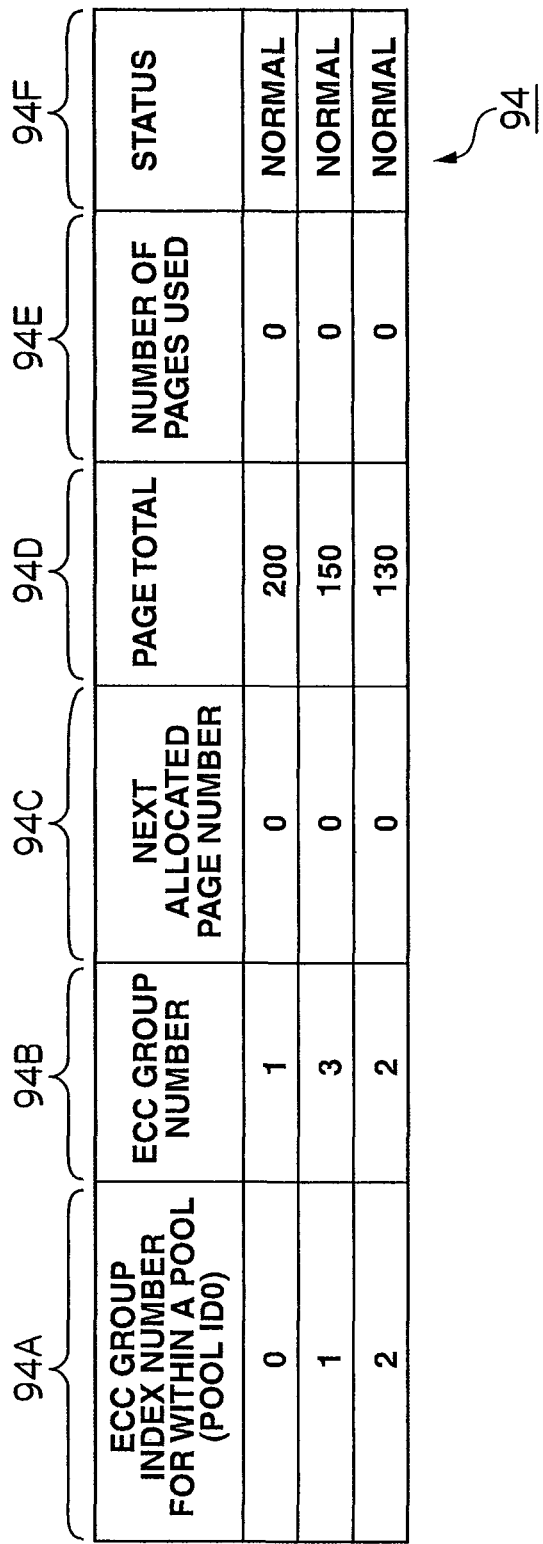
FIG. 10 is a schematic showing configuration information for a page of the first embodiment.

As shown in FIG. 10, page configuration information 94 stores configuration information provided every pool ID that is information indicating a correspondence relationship of pages and ECC groups allocated within pool volume PLVOL.

The page configuration information 94 is configured from "ECC group index number for within a pool" field 94A, "ECC group number" field 94B, "next allocated page number" field 94C, "page total" field 94D, "number of pages used" field 94E, and "status" field 94F.

Index numbers for ECC group numbers within pool region PL are stored in "ECC group index number for within a pool" field 94A. Index numbers are sorted in accordance with the order of processing allocating the pages P.

ECC group numbers are stored in the "ECC group number" field 94B.

The number of the page storing the next data from the host apparatus 2 is stored in the "next allocated page number" field 94C.

Information for the total number of pages P that can be allocated within a certain ECC group is stored in the "page total" field 94D.

The number of individual pages P used allocated within a certain ECC group is stored in the "number of pages used" field 94E.

Information indicating the state within a certain ECC group is stored in the "status" field 94F.

(1-2-3) Outline of Operation of Storage System

Next, a description is given of an outline of the operation of the storage system 1 of this embodiment.

First, a description is given regarding the manner in which data from the host apparatus 2 is allocated to an stored in storage regions within ECC groups of this embodiment based on write requests from the host apparatus 2.

(1-2-3-1) Write Processing at Channel Adapter

A description is now given of write processing for within the channel adapter 7 based on write requests from the host apparatus 2. This write processing is executed by the channel adapter 7 based on the channel adapter write program 70.

Figure 11:
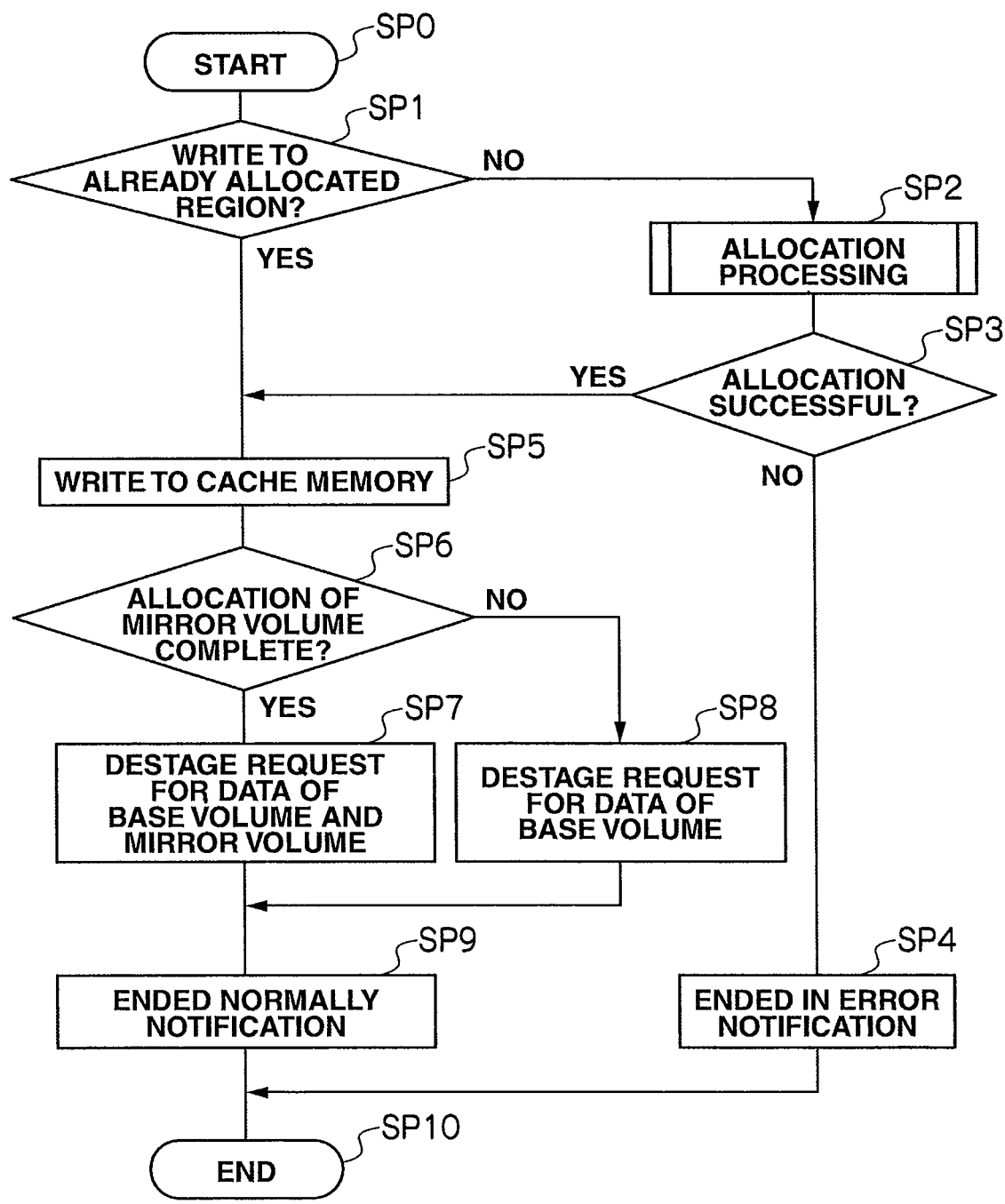
FIG. 11 is a flowchart showing write processing of a channel adapter of the first embodiment.

Specifically, as shown in FIG. 11, this processing is started by the channel adapter 7 receiving a write request from the host apparatus 2 (SP0).

Next, the channel adapter 7 determines whether or not a storage location for the data is a base volume BVVOL allocated and correlated in page units to a storage region within an ECC group based on the write request from the host apparatus 2 (SP1). Specifically, the channel adapter 7 refers to certain virtual volume configuration information 92 in the shared memory 9 and determines whether or not a page number within an ECC group correlated to the volume number of the base volume BVVOL is allocated.

When the channel adapter 7 determines that the storage region within the ECC group correlated to the volume number of the base volume BVVOL is as yet unallocated (SP1: NO), allocation processing is started (SP2). The details of this allocation processing executed by the channel adapter 7 are described in the following.

When the allocation processing is complete, the channel adapter 7 determines whether or not a storage region within the ECC group correlating to the volume number of base volume BVVOL is allocated using page units (SP3).

When the channel adapter 7 determines that allocation of the storage region within the ECC group in page units has failed (SP3: NO), the write process ends in error (SP4), the host apparatus 2 is notified, and the processing ends (SP10). However, when it is determined that allocation in page units is successful (SP3: YES), processing of step SP5 is carried out.

On the other hand, in step SP1, when channel adapter 7 determines that allocation of the storage regions within the ECC group is already complete (SP1: YES), data from the host apparatus 2 is temporarily written to the cache memory 10 (SP5).

Next, the channel adapter 7 determines whether or not a storage location for the data is a mirror volume MVVOL allocated and correlated in page units to a storage region within an ECC group based on the write request from the host apparatus 2 (SP6). Specifically, the channel adapter 7 refers to certain virtual volume configuration information 92 in the shared memory 9 and determines whether or not a page number within an ECC group correlated to the volume number of the mirror volume MVVOL is allocated.

When the channel adapter 7 determines that storage regions within the ECC group correlating with the volume number of the mirror volume MVVOL have already been allocated (SP6: YES), the channel adapter 7 carries out a stage request to the disk adapter 11 in such a manner that data for the base volume BVVOL and mirror volume MVVOL in the cache memory 10 is staged to a page number within the ECC group correlating the base volume BVVOL and the mirror volume MVVOL (SP7).

Further, when the channel adapter 7 determines that storage regions within the ECC group correlated to the volume number of the mirror volume MVVOL are not yet allocated (SP6: NO), a destage request is made to the disk adapter 11 in such a manner that only data of the base volume BVOL within the cache memory 10 is destaged to the page number within the correlated ECC group (SP8).

The channel adapter 7 then notifies the host apparatus 2 that the write processing has finished normal (SP9), and the processing is complete (SP10).

(1-2-3-2) Disk Adapter Write Processing

A description is now given of write processing within disk adapter 11 based on a write request from the host apparatus 2. This write processing is executed by the channel adapter 11 based on the disk adapter write program 110.

Figure 12:
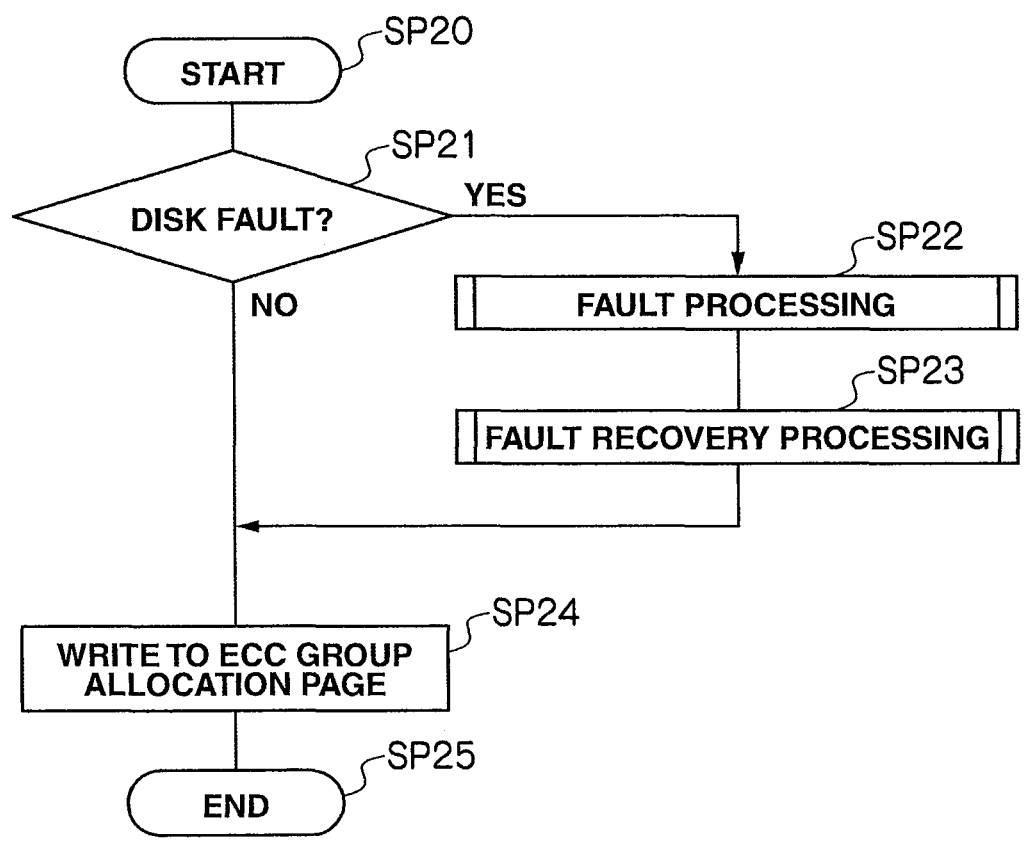
FIG. 12 is a flowchart showing write processing of a disk adapter of the first embodiment.

Specifically, as shown in FIG. 12, this processing is started by the disk adapter 11 receiving a destage request from the channel adapter 7 (SP20).

Upon starting, the disk adapter 11 determines whether or not there is a fault in the hard disks 50 of the ECC group taken to be storing the data (SP21).

When there is determined to be a fault in the hard disks 50 (SP21: YES), the disk adapter 11 carries out fault processing to process the ECC groups the hard disk 50 exhibiting a fault belongs to (SP22) and processing to recover the ECC group the hard disk 50 exhibiting a fault belongs to (SP23). The disk adapter 11 then writes data from the host apparatus 2 to a page P allocated within the ECC group (SP24), and this processing is complete (SP25).

On the other hand, when the disk adapter 11 determines that there are no faults at the hard disks 50 (SP21: NO), data is written from the host apparatus 2 to the page P allocated within the ECC group (SP24), and this processing is complete (SP25).

Figure 13:
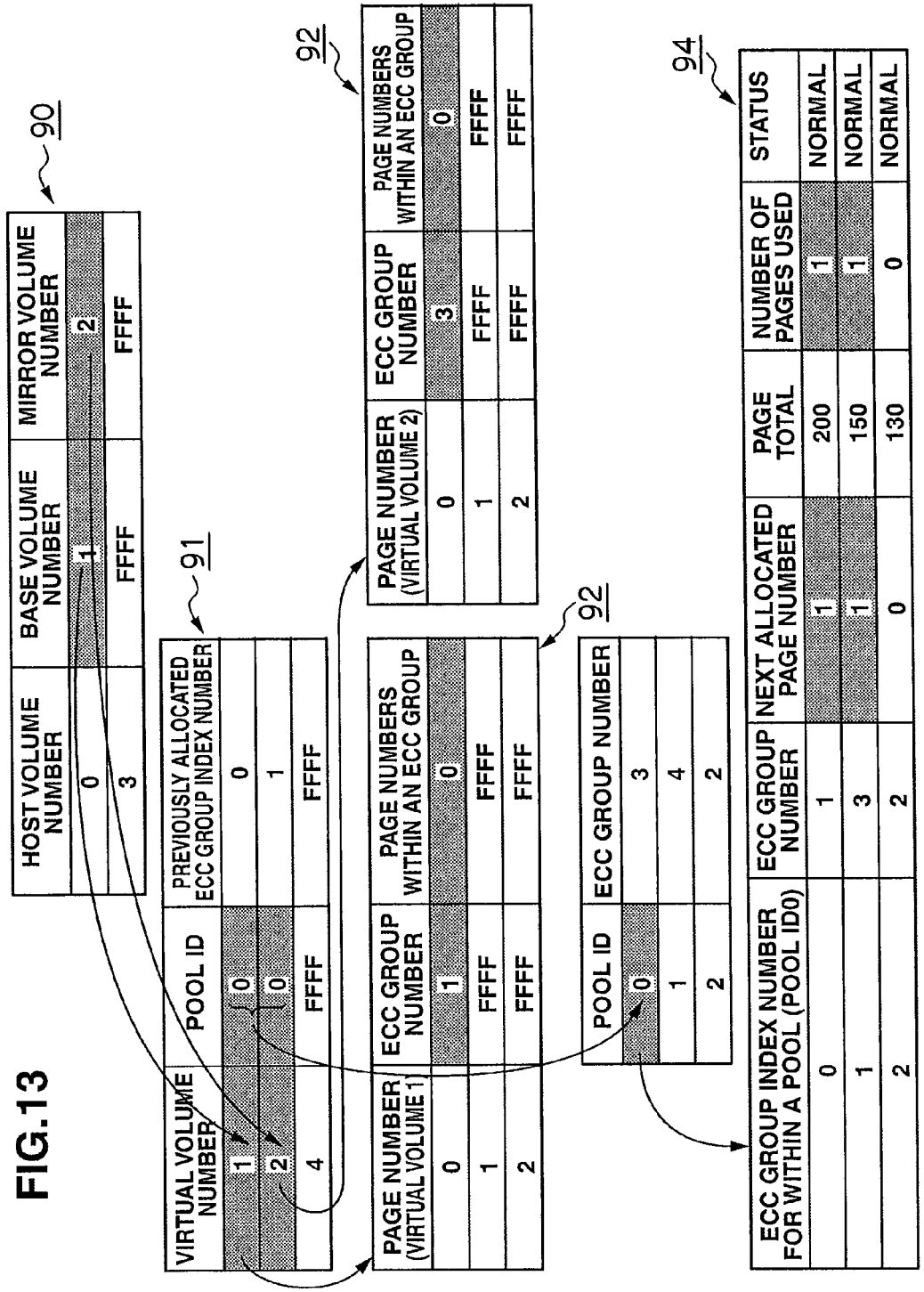
FIG. 13 is a schematic showing various configuration information of the first embodiment.

When data from the host apparatus 2 is normally written to the pate P allocated in a normal manner within the ECC group, each item of configuration information is updated as shown in FIG. 13.

First, a volume number of "1" for base volume BVVOL and a volume number of "2" for mirror volume MVVOL are adopted. Here, the pool ID correlating base volume BVVOL and mirror volume MVVOL is taken to be "0". The base volume BVVOL correlates the ECC group "1" under the control of pool ID "0" and page number "0" within ECC group "1".

Similarly, mirror volume MVVOL correlates with page number "0" within ECC group "3" that is under the control of pool ID "0".

At this time, at the page configuration information 94 configured every pool ID number, allocation is complete for page number "0" of ECC group "1" and "3", and the value of "next allocated page number" field 94C therefore becomes "1".

Further, the "number of pages used" field 94E is updated to "1" in order to use page number "0" of ECC group "1" and "3". In accompaniment with this updating, the values within the "ECC group index number for within a pool" field 94A of the page configuration information 94 are "0" and "1". These are therefore taken as the numbers "0" and "1" within "previously allocated ECC group index number" field 91C, and the virtual volume and pool volume configuration information 91 is updated.

In the above, the flow of write processing from step SP0 to step SP25 is such that data from the host apparatus 2 is distributed at two storage regions within the same or different ECC groups and stored.

(1-2-3-3) Allocation Processing at Channel Adapter 7

Here, in step SP2, a specific description is given of the manner in which the channel adapter 7 carries out allocation processing. This allocation processing is executed by channel adapter 7 based on the allocation program 71.

Figure 14:
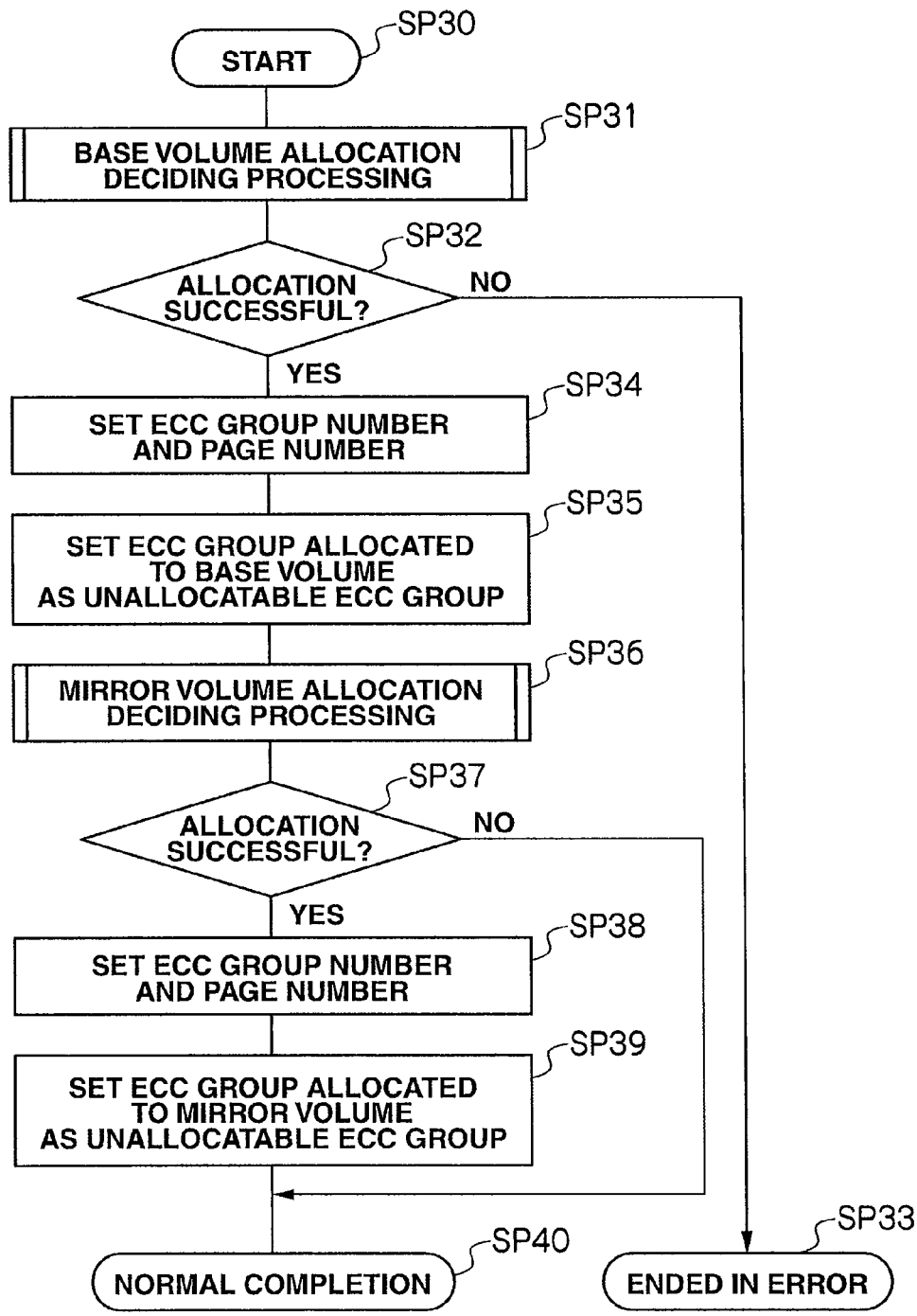
FIG. 14 is a flowchart showing allocation processing of a channel adapter of the first embodiment.

As shown in FIG. 14, in the event that the channel adapter 7 determines that a page P within an ECC group corresponding to the base volume BVVOL is not yet allocated to a storage region of the base volume BVVOL (SP1: NO) or in the event that an ECC group exists where a fault has occurred as described in the following, allocation processing allocating the page P within the ECC group corresponding to the base volume BVVOL is started (SP30). The channel adapter 7 then executes allocation deciding processing for the base volume BVVOL (SP31). The details of this allocation deciding processing executed by the channel adapter 7 are described in the following.

The channel adapter 7 then determines whether or not allocation of the page P within the ECC group corresponding to the base volume BVVOL to the storage region of the base volume BVVOL is successful (SP32), and when it is determined that allocation has failed (SP32: NO), this processing ends in error (SP33).

On the other hand, when the channel adapter 7 determines that allocation of the page P within the ECC group corresponding to the base volume BVVOL to the storage region of the base volume BVVOL is successful (SP32: YES), the allocated ECC group number and page number are set (SP34). The channel adapter 7 then updates the corresponding locations within configuration information 91 for the virtual volume within the shared memory 9 and the pool volume, the virtual volume configuration information 92, and the page configuration information 94.

The channel adapter 7 then sets the ECC group allocated to the base volume BVVOL as an ECC group where allocation is not possible (SP35). This is to ensure that the page P within the same ECC group as the base volume BVVOL is not allocated to the storage region of the mirror volume MVVOL while storing the same data.

Continuing on, the channel adapter 7 starts allocation deciding processing to allocate storage regions of the mirror volume MVVOL and pages P within the ECC group (SP36). The details of this allocation processing executed by the channel adapter 7 are described in the following. The channel adapter 7 then carries out the processing from step SP37 to step SP39 using the same procedure as for the processing of step SP32 to SP35. The channel adapter 7 then allocates the page P of the ECC group corresponding to the mirror volume MVVOL to the storage region of the mirror volume MVVOL, and the allocation processing is complete (SP40).

(1-2-3-4) Allocation Deciding Processing at Channel Adapter 7

Here, in step SP31 or step SP36, a specific description is given of the manner in which the channel adapter carries out allocation deciding processing. This allocation deciding processing is executed by channel adapter 7 based on the allocation deciding program 72. Here, a description is given for deciding in what manner to allocate the page within the ECC group to the storage region of the base volume BVVOL but it is taken that the same processing procedure is carried out for the mirror volume MVVOL.

Figure 15:
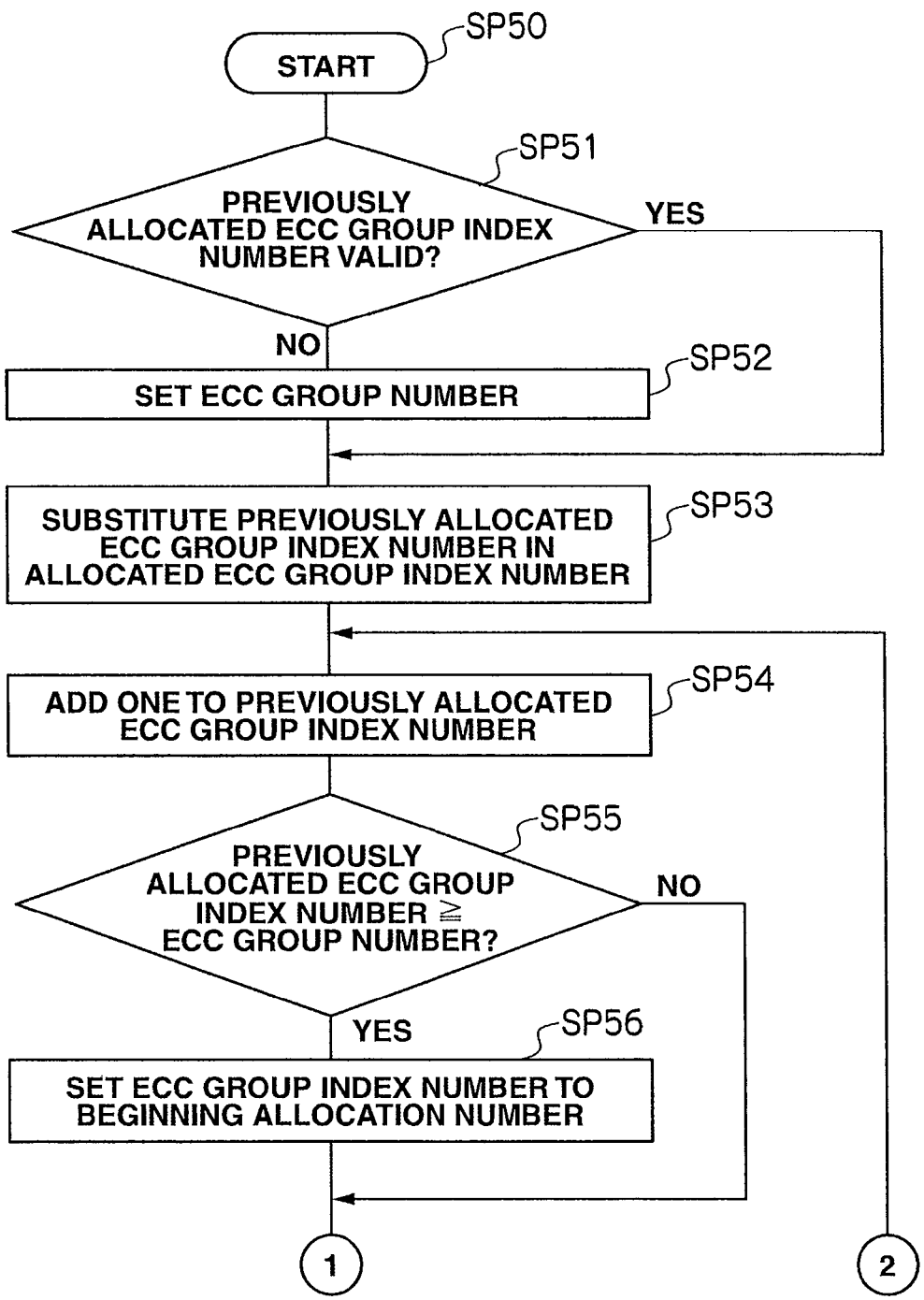
FIG. 15 is a flowchart showing allocation and deciding processing of a channel adapter of the first embodiment.
Figure 16:
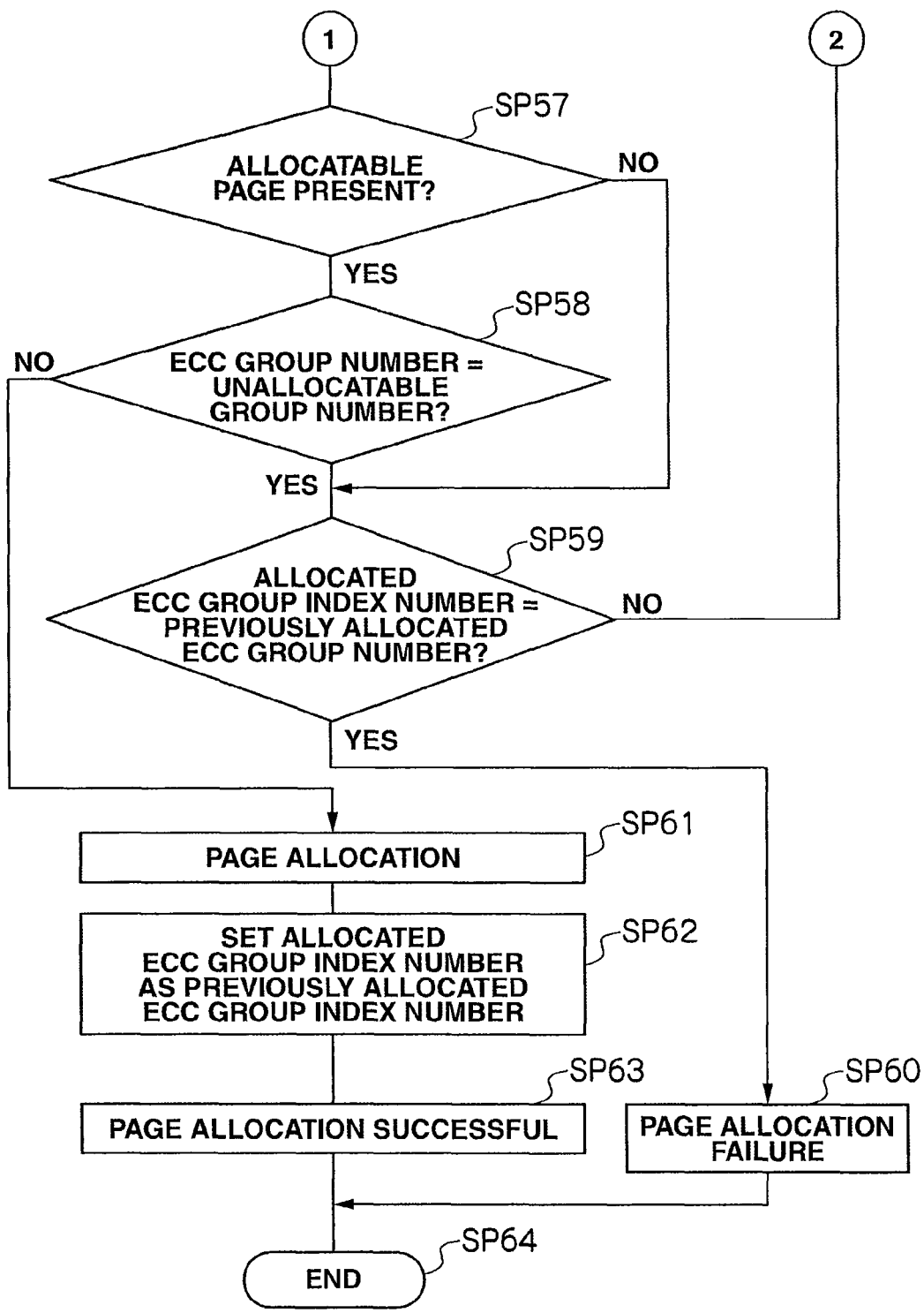
FIG. 16 is a further flowchart showing allocation and deciding processing of a channel adapter of the first embodiment.

As shown in FIG. 15 and FIG. 16, in the event that the channel adapter 7 determines that the page P within the ECC group corresponding to the base volume BVVOL is not yet allocated to the BVVOL storage region of the base volume (SP1: NO), allocation deciding processing is started to allocate the storage region of the base volume BVVOL and the page P within the ECC group (SP50).

The channel adapter 7 refers to the "previously allocated ECC group index number" field 91C of the configuration information 91 of the virtual volume and pool volume, and determines whether or not the previously allocated ECC group index number corresponding to the base volume BVVOL is valid (SP51). For example, as shown in FIG. 17, the index number allocated the previous time is taken to be "0".

The channel adapter 7 is allocated with the ECC group index number allocated the previous time corresponding to the base volume BVVOL and when this is determined to be valid (SP51: YES), step SP53 is proceeded to.

On the other hand, if the channel adapter 7 determines that a previously allocated ECC group index number is not inputted to the "previously allocated ECC group index number" field 91C and is actually "FFFF" (SP51: NO), the ECC group number that is under the control of the pool ID is set to the "previously allocated ECC group index number" field 91C (SP52).

For example, when it is taken that the pool ID corresponding to virtual volume number "1" of the base volume BVVOL and virtual volume number "2" of mirror volume MVVOL is "0", an ECC group number of "3" that is under the control of the pool volume PVOL0 of pool ID "0" is set.

The channel adapter 7 then substitutes the previously allocated ECC group index number at the ECC group index number allocated this time (SP53).

For example, as shown in FIG. 17, the previously allocated ECC group index number is "0", and the ECC group number under the control of the pool volume PLVOL0 is "3". The ECC group index numbers allocated this time are therefore "1" and "2". The previously allocated ECC group index number "0" is then substituted in the ECC group index number for this time. In this step, previously allocated ECC group index number becomes "0".

The channel adapter then adds 1 to the ECC group index number allocated this time (SP54).

For example, as shown in FIG. 17, 1 is added to the ECC group index number "0" allocated this time decided in step SP53. This then constitutes the start order for allocating the ECC group index number "1".

Next, the channel adapter 7 determines whether or not the ECC group index number allocated on this occasion is the same as the ECC group number or is a number larger than the ECC group number (SP55).

When the channel adapter 7 determines that the ECC group index number allocated this time is the same as the ECC group number or is a number larger than the ECC group number (SP55: YES), the ECC group index number is set to the beginning number of the allocation (SP56).

Here, the beginning number for allocation of the ECC group index number is always set to "0". The ECC group allocated this time can be allocated to the index number within the ECC group under the control of the pool ID with the exception of the ECC group index number allocated this time.

On the other hand, when it is determined that the channel adapter 7 determines whether or not the ECC group index number allocated on this occasion is not the same as the ECC group number or is a number smaller than the ECC group number (SP55: NO), step SP57 is proceeded to.

The channel adapter 7 then refers to the total number of pages for the ECC group corresponding to the ECC group index number allocated this time that is the beginning number and the number of pages used, and determines whether or not allocatable pages are present (SP57).

In the event that the channel adapter 7 determines that there are no allocatable pages (SP57: NO), step SP59 is proceeded to.

On the other hand, in the event that the channel adapter 7 determines that an allocatable page is present (SP57: YES), the channel adapter determines whether or not the ECC group number allocated on this occasion is an unallocatable ECC group number (SP58).

When the channel adapter 7 determines that the ECC group number allocated this time is an unallocatable ECC group number (SP58: YES), next, the channel adapter 7 determines whether or not the ECC group index number allocated this time is the ECC group index number allocated the previous time (SP59).

In the event that the channel adapter 7 determines that the ECC group index number allocated this time is the ECC group index number allocated the previous time (SP59: YES), allocation of the page P fails because the ECC group is already allocated (SP60), and this processing ends (SP64).

On the other hand, when the channel adapter 7 determines that the ECC group index number allocated this time is not the ECC group index number allocated the previous time (SP59: NO), step SP54 is returned to. For example, as the ECC index number "1" allocated this time is not the ECC group number "0" allocated the previous time, step SP54 is returned to again, and processing is carried out for the ECC group index number "2".

In step SP58, when the channel adapter 7 determines that the ECC group number allocated this time is not the unallocatable ECC group number (SP58: NO), page P is allocated (SP61).

After this, the channel adapter 7 sets the ECC group index number allocated this time as the previously allocated ECC group index number (SP62), allocation of the page P is successful (SP63), and this processing is complete (SP64).

When this processing is complete (SP64), the channel adapter 7 carries out the determination of step SP32 or step SP37 described previously based on the results determined in the allocation deciding processing, and allocation processing is executed.

(1-2-3-5) Disk Adapter Fault Processing

A detailed description is now given of in what manner the disk adapter 11 carries out fault processing for the ECC group a hard disk 50 for which a fault has occurred belongs to in step SP22. The disk adapter 11 executes this fault processing based on fault program 111.

Figure 18:
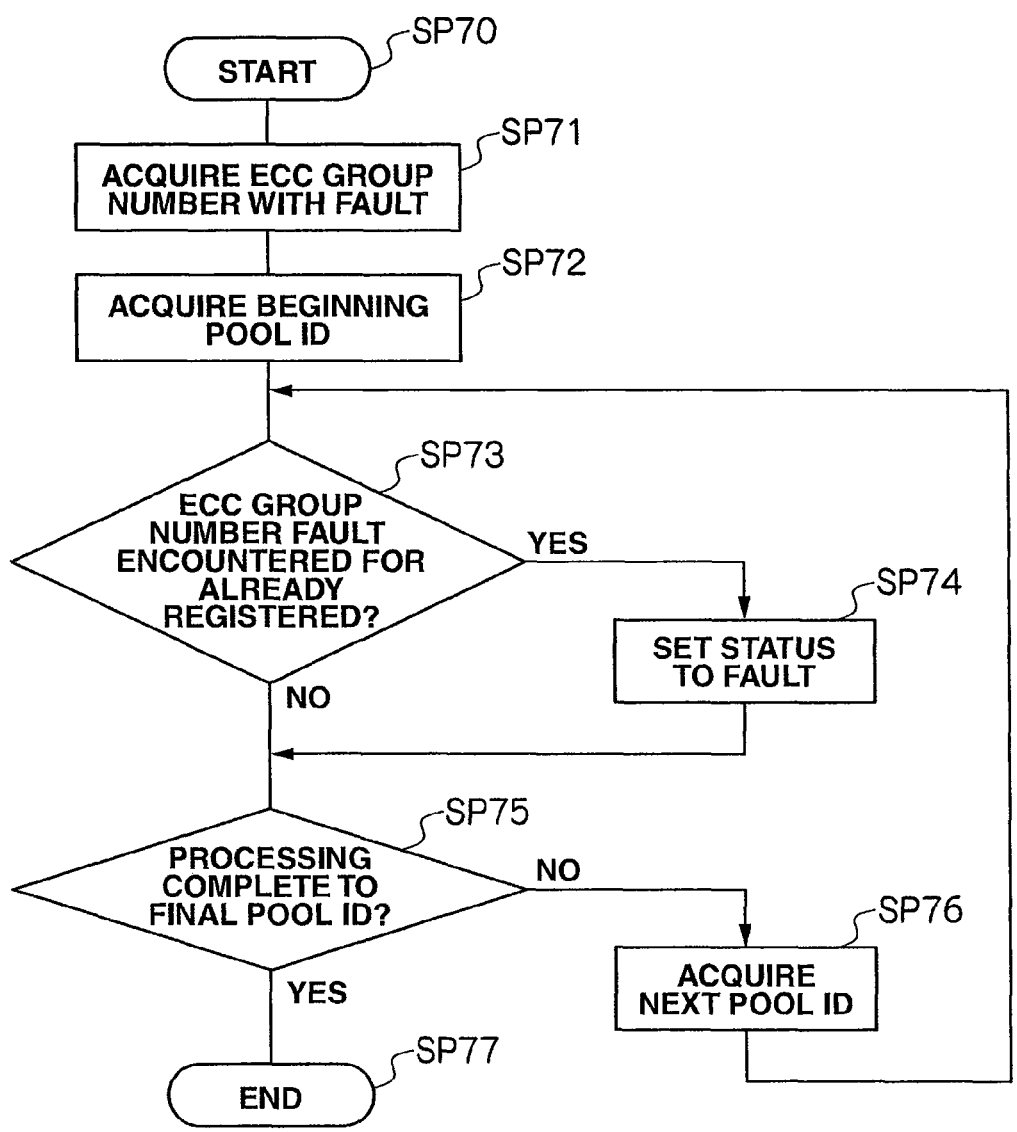
FIG. 18 is a flowchart showing fault processing of a disk adapter of the first embodiment.

When the disk adapter 11 determines that there is a fault at a hard disk 50 (SP21: NO), as shown in FIG. 18, fault processing begins (SP70).

The disk adapter 11 then acquires the number of the ECC group the page P for which the fault has occurred belongs to from the virtual volume configuration information 92 (SP71).

Next, the disk adapter 11 refers to the pool configuration information 94 and acquires the begging pool ID (SP72).

The disk adapter 11 then refers to the page configuration information 94 for the begging pool ID, and determines whether or not the number of the ECC group the hard disk 50 where the fault occurred belongs to is registered in the page configuration information 94 (SP73).

When the disk adapter 11 determines that the number of the ECC group the disk 50 where a fault has occurred belongs to is registered in the page configuration information 94 (SP73: YES), the "status" field of the number ECC group where a fault occurred for the page configuration information 94 is set to "fault" (SP74), and step SP75 is proceeded to. For example, page configuration information 94 for pool ID 0 is shown in FIG. 19. When a fault occurs at ECC group 1, the "status" field 94F of ECC group 1 is set to "fault".

When the disk adapter 11 determines that the number of the ECC group the hard disk 50 where a fault has occurred belongs to is not registered in the page configuration information 94 (SP73: NO), it is determined whether or not to carry out fault processing for all of the pool ID's enumerated in the pool configuration information 93 (SP75).

When the disk adapter 11 determines not to carry out fault processing for all of the pool ID's enumerated in the pool configuration information 93 (SP75: NO), the next pool ID enumerated in the pool configuration information 93 is acquired (SP76), step SP73 is again returned to, and fault processing is carried out for the ECC group for where a fault has occurred from the next pool ID.

Further, when the disk adapter 11 determines to carry out fault processing for all of the pool ID's enumerated in the pool configuration information 93 (SP75: YES), the fault processing ends (SP77).

The disk adapter 11 then ends this processing (SP77), and fault recovery processing (SP23) shown in FIG. 12 is executed.

(1-2-3-6) Disk Adapter Fault Recovery Processing

Continuing on, in step Sp23, a detailed description is given of fault recovery processing to determine in what way the disk adapter 11 is to restore the allocation region allocated within the ECC group the hard disk 50 for which a fault has occurred belongs to. The disk adapter 11 executes this fault recovery processing based on fault recovery program 112.

Figure 20:
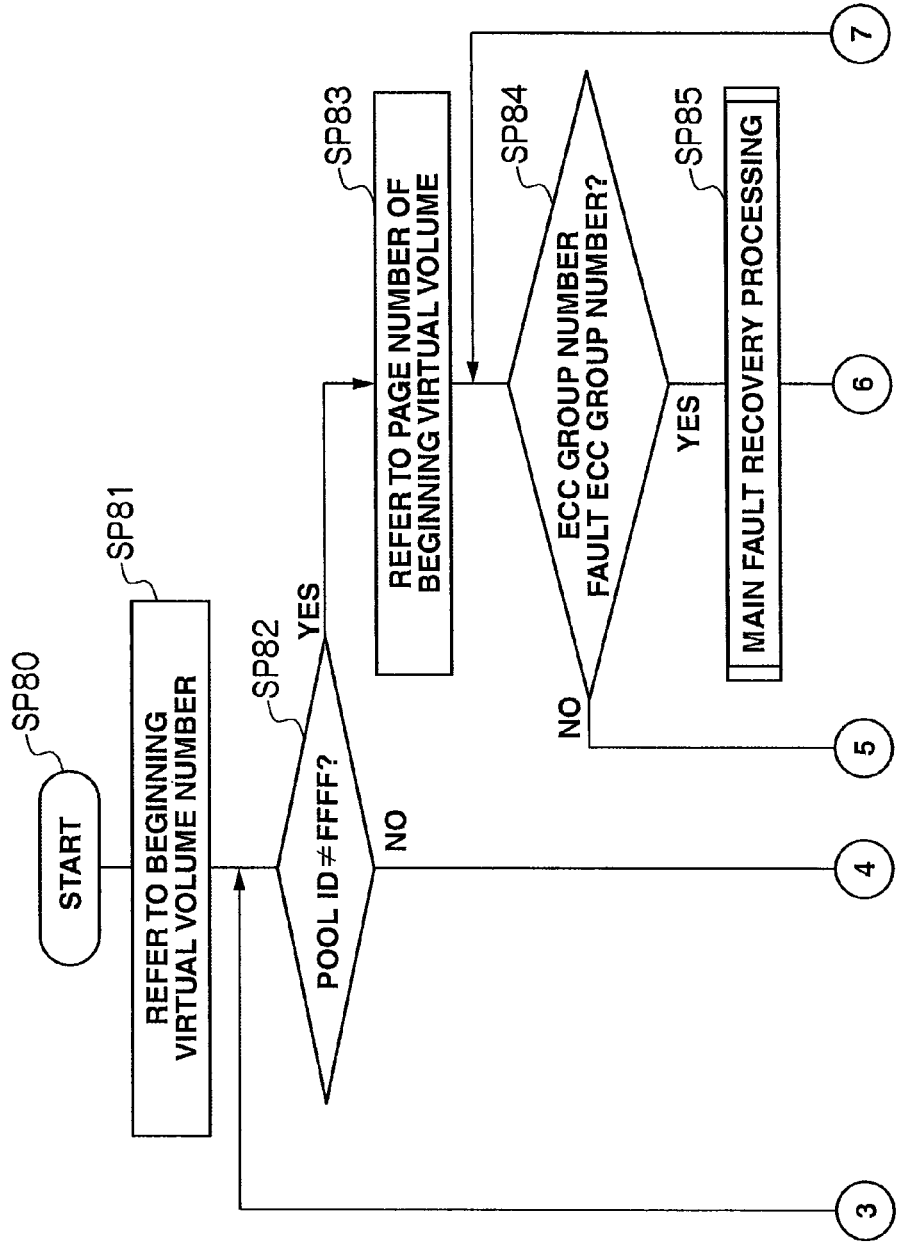
FIG. 20 is a flowchart showing fault recovery processing of a disk adapter of the first embodiment.

In the event that the disk adapter 11 detects the number of the ECC group the fault has occurred for by executing the fault processing described above, as shown in FIG. 20 and FIG. 21, the fault recovery processing is started (SP80).

First, the disk adapter 11 refers to the virtual volume and pool volume configuration information 91, and acquires the beginning virtual volume number (SP81). For example, in the event that the ECC group a fault has occurred for is ECC group 1, the numbers of the virtual volumes the ECC group 1 is correlated to are "1" and "2". Therefore, in this case, the number for the beginning virtual volume is "1".

Next, the disk adapter 11 refers to the virtual volume and pool volume configuration information 91, and determines whether or not "pool ID" field 91B corresponding to the acquired beginning virtual volume number is "FFFF" indicating that allocation has not yet been made or use has not yet taken place (SP82).

When the disk adapter 11 determines that the "pool ID" field 91B corresponding to the acquired beginning virtual volume number is "FFFF" indicating that allocation or use has not yet taken place (SP82: NO), step SP91 is proceeded to.

On the other hand, when the disk adapter 11 determines that the "pool ID" field 91B corresponding to the acquired beginning virtual volume number is "FFFF" indicating that allocation or use has not yet taken place (SP82: YES), the disk adapter 11 refers to the virtual volume configuration information 92 for the number of the beginning virtual volume, and refers to the page number of the virtual volume (SP83). For example, when the disk adapter 11 refers to the virtual volume configuration information 92 of the virtual volume 1, the page numbers for the virtual volume are "0", "1" and "2".

The disk adapter 11 then determines whether or not the ECC group number corresponding to the page number of the virtual volume referred to is an ECC group number a fault has occurred for based on the virtual volume configuration information 92 for the beginning virtual volume number (SP84).

When the disk adapter 11 determines that the ECC group number corresponding to the page number of the referred to virtual volume is not an ECC group number a fault has occurred for (SP84: NO), step SP89 is proceeded to.

On the other hand, when the disk adapter 11 determines that the ECC group number corresponding to the page number of the referred to virtual volume is an ECC group number a fault has occurred for (SP84: YES), main fault recovery processing is carried out (SP85). This fault recovery main processing is described in the following.

Next, disk adapter 11 determines whether or not recovery of the allocated region is successful based on the processing results of the main fault recovery processing (SP86), and when it is determined that it is not possible to recover allocated regions within the ECC group where the fault has occurred (SP86: NO), notification to the effect that there is no region it is possible to allocate to an extent where recovery is possible is carried out (SP87), and this processing ends in error (SP88).

When the disk adapter 11 determines that the allocated region has been recovered from the processing results for the main fault recovery processing (SP86: YES), the disk adapter 11 determines whether or not to refer as far as the page number of the final virtual volume (SP89).

When the disk adapter 11 determines that up to the page number of the final virtual volume is not referred to (SP89: NO), the page number of the next virtual volume is referred to (SP90), and with regards to the ECC group number corresponding to the page number of the next virtual volume, step SP84 is again returned to, and processing is executed.

Further, when the disk adapter 11 determines to refer as far as the page number of the final virtual volume (SP89: YES), it is determined whether or not to refer to as far as the final virtual volume number enumerated in the virtual volume configuration information 92 (SP91).

When the disk adapter 11 then determines that referral does not take place up to the final virtual volume number (SP91: NO), the next virtual volume number is referred to (SP92), and step SP82 is returned to.

In the event that the disk adapter 11 determines to refer as far as the final virtual volume number (SP91: YES), the fault recovery processing is complete (SP93).

After this, the disk adapter 11 then ends this processing (SP93), and SP24 shown in FIG. 12 is executed.

(1-2-3-7) Main Disk Adapter Fault Recovery Processing

Further, a detailed description is given in step SP85 with regards to the manner in which disk adapter 11 carries out recovery processing for the data within a region allocated for an ECC group where a fault has occurred. The disk adapter 11 executes this main fault recovery processing based on the main fault recovery program 113.

Figure 22:
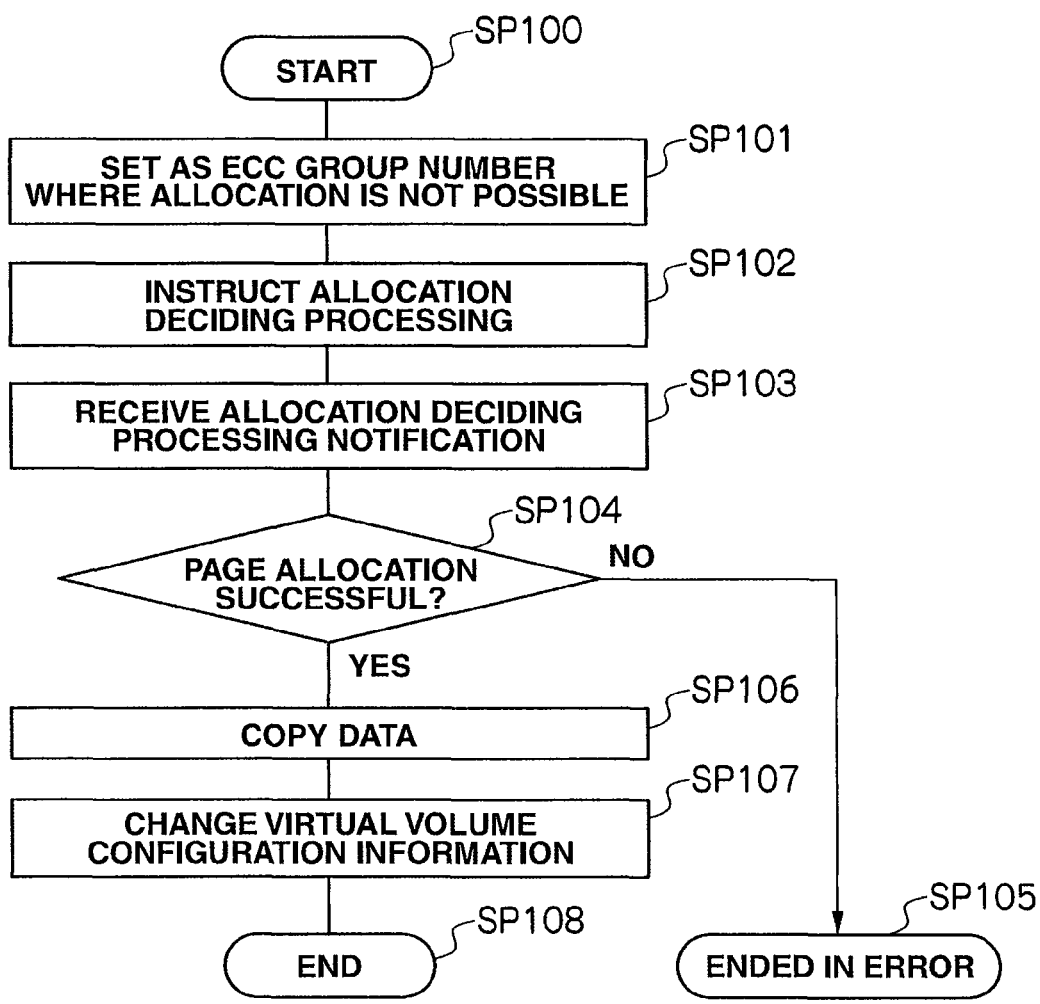
FIG. 22 is a flowchart showing main processing for fault recovery of a disk adapter of the first embodiment.

First, when the disk adapter 11 determines that the ECC group number corresponding to the page number of the referred to virtual volume is an ECC group number a fault has occurred for (SP84: YES), as shown in FIG. 22, the disk adapter 11 starts main fault recovery processing (SP100).

The disk adapter 11 then sets the number of the ECC group where a fault has occurred as an ECC group number where allocation is not possible (SP101). At this time, pairs of storage regions correlated with the number of the ECC group where a fault has occurred are also set as ECC group numbers where allocation is not possible. After this, the disk adapter 11 instructs the channel adapter 7 to carry out page allocation deciding processing for the base volumes BVVOL and mirror volumes MVVOL correlated to the ECC group allocation is not possible for (SP102).

In accordance with this instruction, the channel adapter 7 executes processing from step SP30 to step SP40 and from step SP50 to step SP64.

When the disk adapter 11 receives notification of page allocation deciding processing from the channel adapter 7 (SP103), the disk adapter 11 determines whether or not it was possible to allocate pages from ECC groups excluding the ECC group where the fault occurred (SP104), and when it is determined that page allocation failed (SP104: NO), this processing ends with an error (SP105).

On the other hand, when the disk adapter 11 determines that it is possible to allocate pages from ECC groups other than the ECC group a fault has occurred for (SP104: YES), data is copied from the page paired with the page a fault has occurred for to page P the allocation is successful for (SP106).

Figure 23:
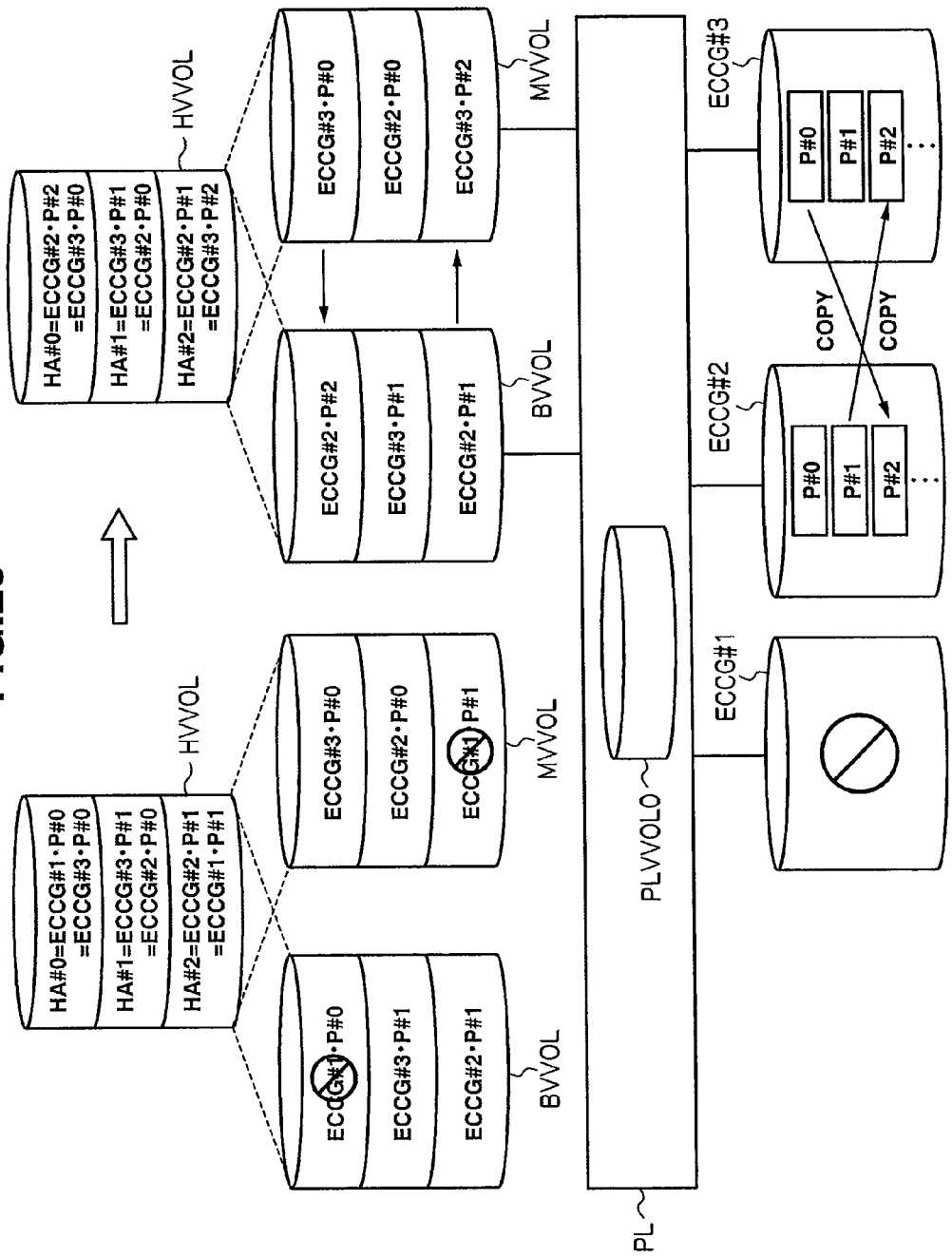
FIG. 23 is a schematic view illustrating fault recovery processing of a disk adapter of the first embodiment.

For example, as shown in FIG. 23, a description is given of the case where an ECC group where a fault id generated is ECC group 1.

Storage regions within the base volumes BVVOL constituting the host volumes HVVOL are correlated with page P0 of the ECC group 1. Similarly, storage regions within the mirror volumes MVVOL constituting the host volumes HVVOL are correlated with page P1 of the ECC group 1.

It is not possible to use storage regions of base volumes BVVOL or mirror volumes MVVOL correlated with ECC group 1 a fault has occurred for.

Page P2 of ECC group 2 within the storage region within base volume BVVOL is then allocated as a result of this allocation deciding processing, and correspondence of page P2 of the ECC group 2 correlated to page P0 of the ECC group 1 is changed. Similarly, Page P2 of ECC group 3 within the storage region within mirror volume MVVOL is then allocated, and correspondence of page P2 of the ECC group 3 correlated to page P1 of the ECC group 1 is changed.

Data is then copied from page P0 of the ECC group 3 storing the same data that has a pair relationship with the page P0 of the ECC group 1 to page P2 of the newly allocated ECC group 2. Similarly for page P2 of the newly allocated ECC group 3, data stored in page P1 of the ECC group 2 is copied to page P2 of the ECC group 3. This copy processing is carried out between ECC groups.

When copying is complete, disk adapter 11 changes the virtual volume configuration information 92 (Sp107) and ends the main fault recovery processing (SP108).

Figure 21:
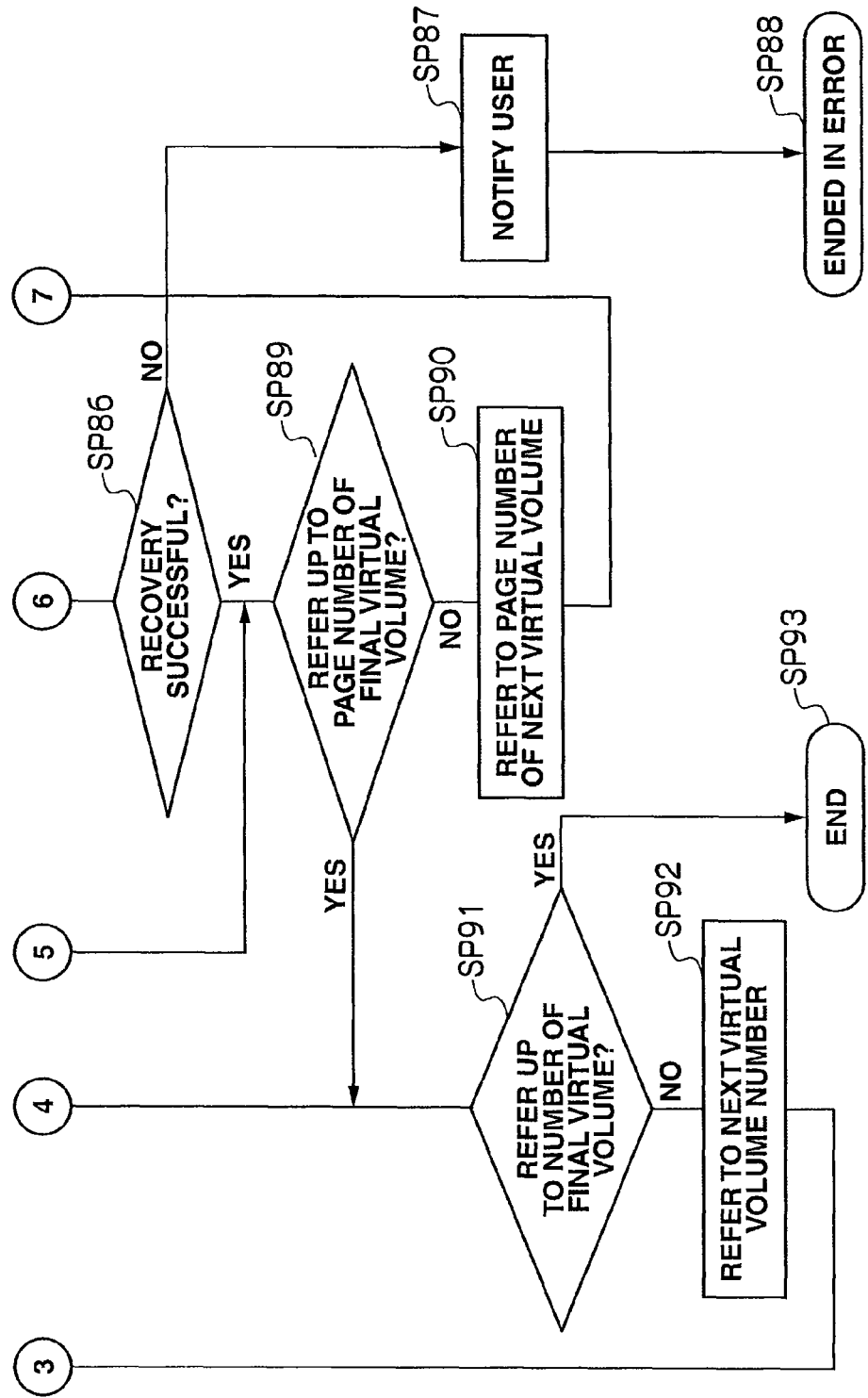
FIG. 21 is a further flowchart showing fault recovery processing of a disk adapter of the first embodiment.

After this, the disk adapter 11 then ends this processing (SP108), and SP86 shown in FIG. 21 is executed.

As a result of the respective processes carried out above, the channel adapter 7 and the disk adapter 11 allocate a page within a different ECC group at a paired volume based on a write request from the host apparatus 2 and it is possible to save the same data on the respective pages. This means that even if a fault occurs at one ECC group, it is possible to recover data by ensuring an allocated region within another ECC group.

(1-2-3-8) Channel Adapter Read Processing

A description is now given of read processing for within the channel adapter 7 based on read requests from the host apparatus 2. This read processing is executed by the channel adapter 7 based on the channel adapter read program 73.

Figure 24:
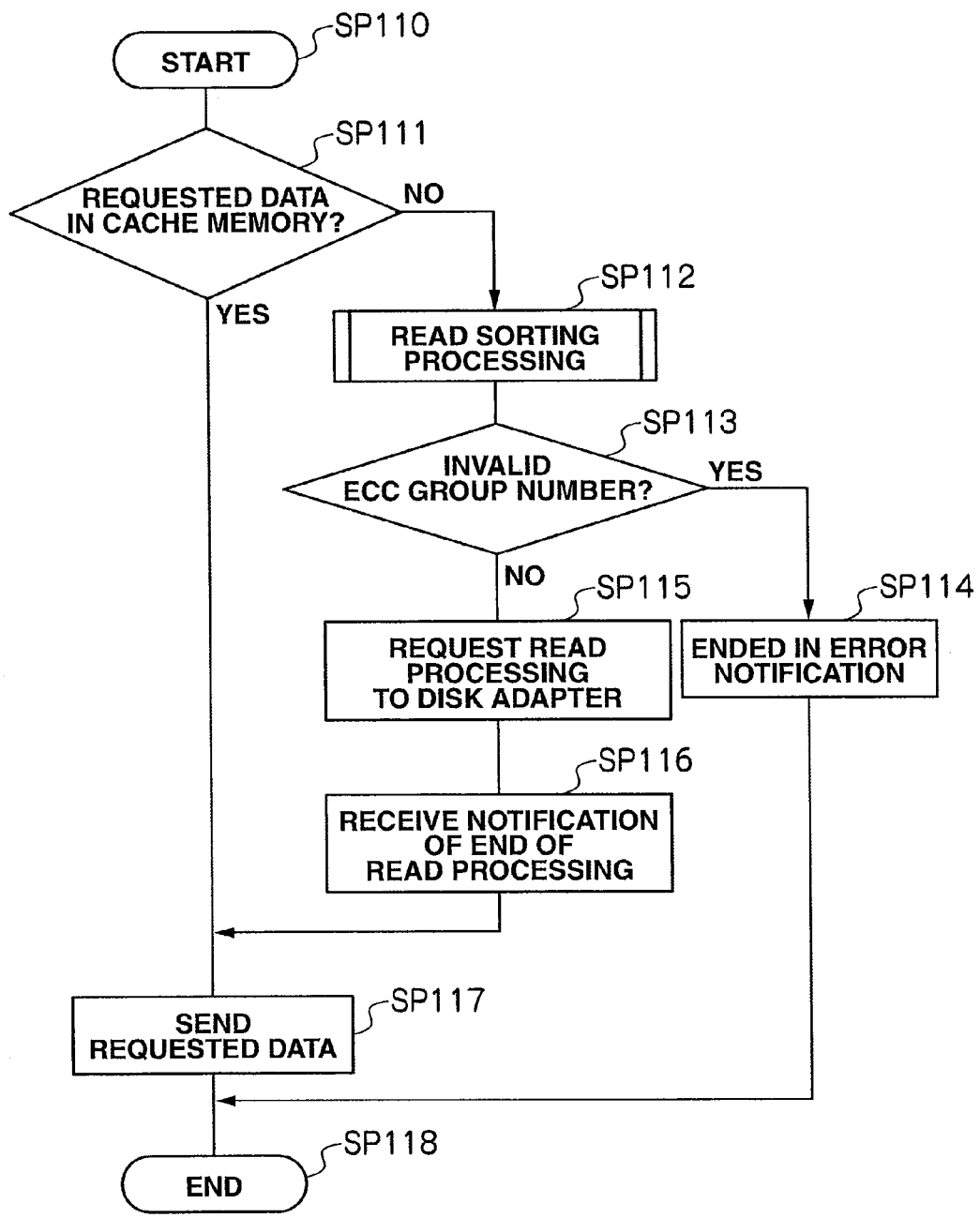
FIG. 24 is a flowchart showing read processing of a channel adapter of the first embodiment.

Specifically, as shown in FIG. 24, upon receiving a read request from the host apparatus 2, the channel adapter 7 starts read processing on the side of the channel adapter 7 (SP110).

Next, the channel adapter 7 determines whether or not data requested from the host apparatus 2 is present within the cache memory 10 (SP111).

In the event that the channel adapter 7 determines that data requested by the host apparatus 2 is not in the cache memory 10 (SP111: NO), read sorting processing is carried out in order that the requested data saved in page P within the ECC group is read out (SP112). This read sorting processing is described in the following.

The channel adapter 7 determines whether or not a read out ECC group number is an invalid ECC group number based on the results of the read sorting processing (SP113). When the channel adapter 7 determines that the ECC group number is an invalid ECC group number (SP113: YES), the host apparatus 2 is instructed to the effect that the read processing ended in error (SP114), and the read processing ends (SP118).

On the other hand, when the channel adapter 7 determines that the read out ECC group number is not an invalid ECC group number (SP113: NO), a read processing request is made to the disk adapter 11 (SP115).

After this, when the channel adapter 7 receives notification of read processing completion executed at the side of the disk adapter 11 (SP116), the requested data is sent to the host apparatus 2 (SP117), and the read processing ends (SP118).

In step SP111, when it is determined that data requested by the host apparatus 2 is present in the cache memory 10 (SP111: YES), data requested from the cache memory 10 is sent to the host apparatus 2 (SP117), and the read processing ends (SP118).

(1-2-3-9) Disk Adapter Read Processing

A description is now given of read processing for in the disk adapter 11 based on read requests from the host apparatus 2. This read processing is executed by the disk adapter 11 based on the disk adapter read program 114.

Figure 25:
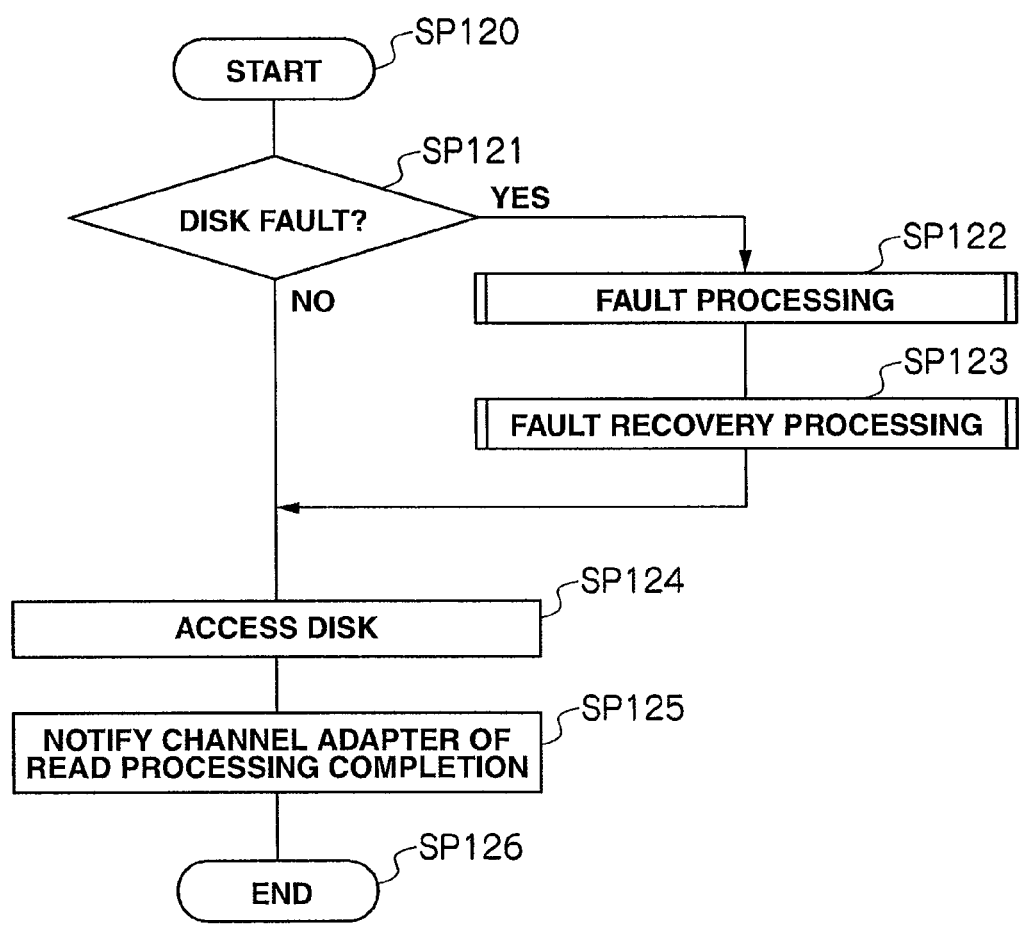
FIG. 25 is a flowchart showing read processing of a disk adapter of the first embodiment.

As shown in FIG. 25, when a read processing request is received from the channel adapter 7, the disk adapter 11 starts read processing on the side of the disk adapter 11 (SP120).

The disk adapter 11 then determines whether or not there is a fault in the hard disks 50 (SP121). When a fault is present (SP121: YES), the processing of step SP122 and SP123 is carried out in the same way as the processing procedure for steps SP22 and SP23, and step SP124 is proceeded to after fault recovery.

On the other hand, in the event that it is determined that there is no fault at the hard disks 50 (SP121: NO), the ECC group the hard disk 50 storing the data requested by the host apparatus 2 is accessed (SP124), the data requested by the host apparatus 2 is read out, the channel adapter 7 is notified of completion of the read processing (SP125), and this processing ends (SP126).

(1-2-3-10) Read Sort Processing at the Channel Adapter

A detailed description is now given of the manner in which read sorting processing is carried out in the channel adapter 7 based on read requests from the host apparatus 2 in step SP112. This read sorting processing is executed by the channel adapter 7 based on the read sorting program 74.

Figure 26:
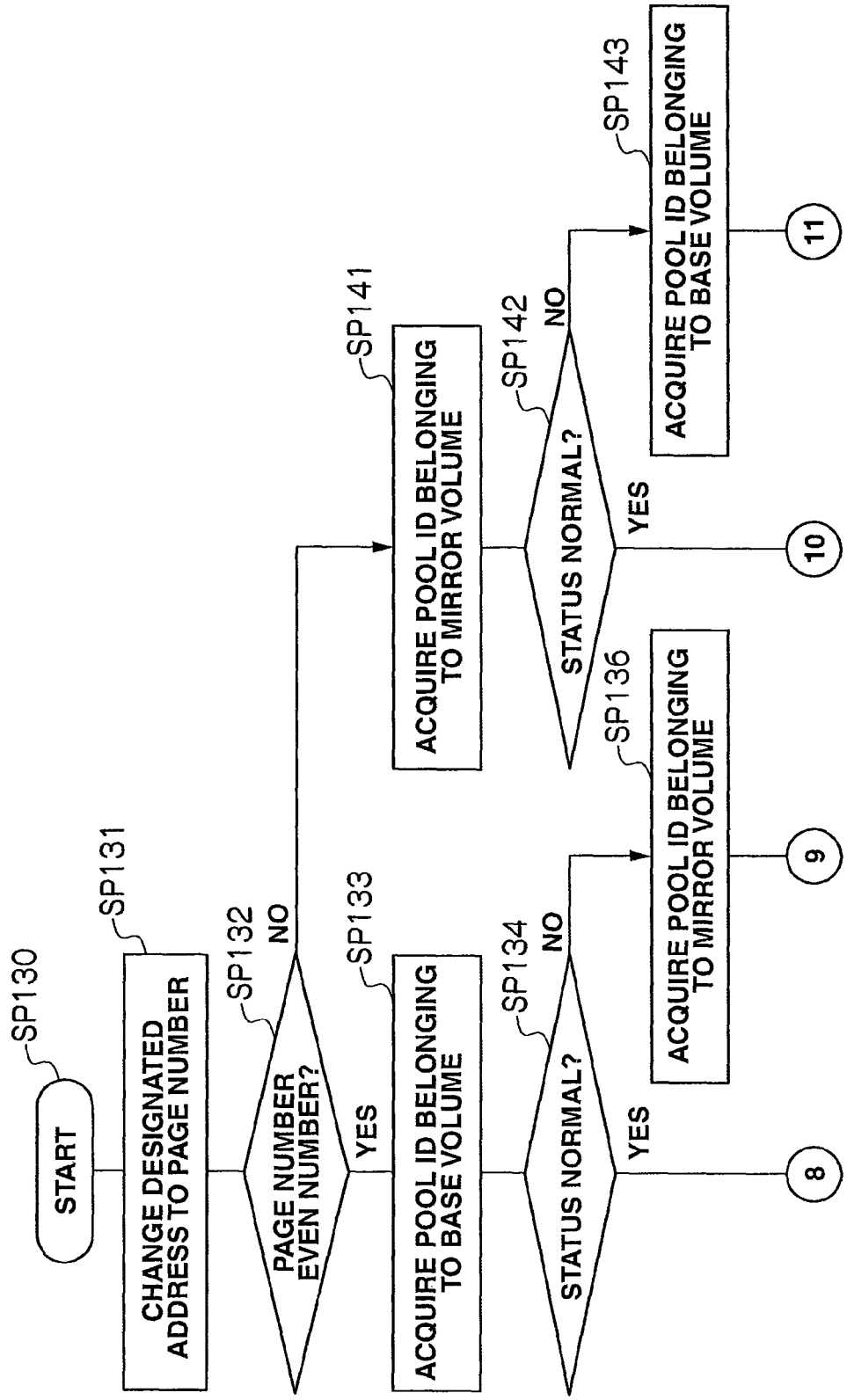
FIG. 26 is a flowchart showing read sorting processing of a channel adapter of the first embodiment.
Figure 27:
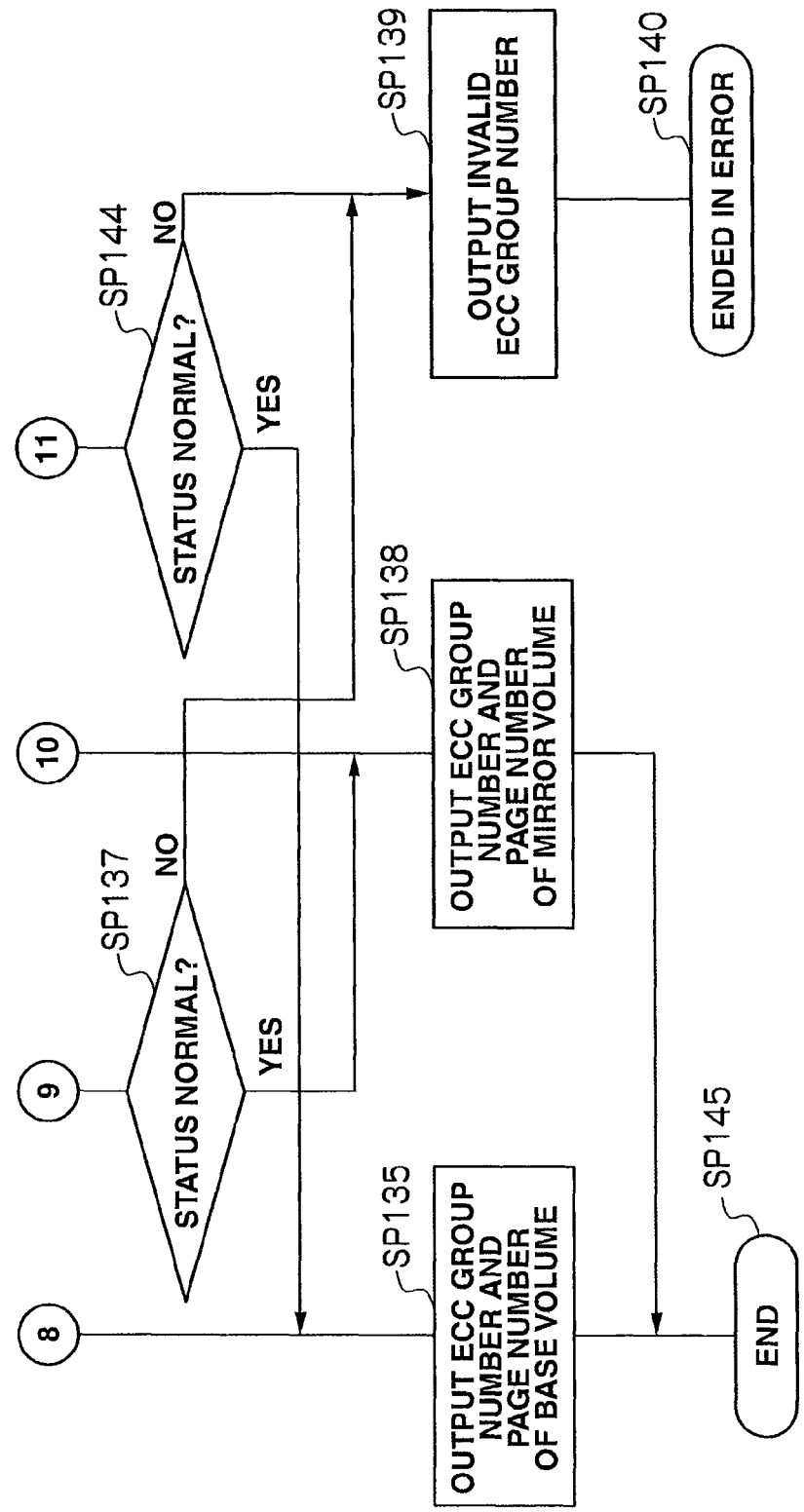
FIG. 27 is a further flowchart showing read sorting processing of a channel adapter of the first embodiment.

Specifically, in the event that the channel adapter 7 determines that data requested by the host apparatus 2 is not in the cache memory 10 (SP111: NO), as shown in FIG. 26 and FIG. 27, read sorting processing is carried out in order that the requested data saved in page P within the ECC group is started (SP130).

Next, the channel adapter 7 converts the address designated by the host apparatus 2 using a read request to a page number (SP131), and determines whether or not the converted page number is an even number (SP132).

When the page number is an even number (SP132: YES), the channel adapter 7 refers to the virtual volume and pool volume configuration information 91, and acquires the pool ID correlating to the base volume BVVOL (SP133).

The channel adapter 7 acquiring the pool ID correlated to the base volume BVVOL then refers to the page configuration information 94 in the possession of the pool ID number, and confirms whether or not the "status" field 94F is normal (SP134).

When this is confirmed to be normal (SP134: YES), the channel adapter 7 outputs the ECC group number and page number correlated to the base volume BVVOL (SP135), and ends the read sorting processing (SP145).

When a fault is confirmed (SP134: NO), the channel adapter 7 refers to the virtual volume and pool volume configuration information 91, and acquires the pool ID correlating to the mirror volume MVVOL (SP136).

The channel adapter 7 acquiring the pool ID correlated to the mirror volume MVVOL then refers to the page configuration information 94 in the possession of the pool ID number, and confirms whether or not the "status" field 94F is normal (SP137).

When this is confirmed to be normal (SP137: YES), the channel adapter 7 outputs the ECC group number and page number correlated to the mirror volume MVVOL (SP138), and ends the read sorting processing (SP145).

On the other hand, when a fault is confirmed (SP137: NO), the channel adapter 7 outputs an invalid ECC group number (SP139), and the read sort processing ends in error (SP140).

In step SP132, when the page number is an odd number (SP132: NO), the channel adapter 7 refers to the virtual volume and pool volume configuration information 91, and acquires the pool ID correlating to the mirror volume MVVOL (SP141).

The channel adapter 7 acquiring the pool ID correlated to the mirror volume MVVOL then refers to the page configuration information 94 in the possession of the pool ID number, and confirms whether or not the "status" field 94F is normal (SP142).

When this is confirmed to be normal (SP142: YES), the channel adapter 7 outputs the ECC group number and page number correlated to the mirror volume MVVOL (SP138), and ends the read sorting processing (SP145).

On the other hand, when a fault is confirmed (SP142: NO), the channel adapter 7 refers to the virtual volume and pool volume configuration information 91, and acquires the pool ID correlating to the base volume BVVOL (SP143).

The channel adapter 7 acquiring the pool ID correlated to the base volume BVVOL then refers to the page configuration information 94 in the possession of the pool ID number, and confirms whether or not the "status" field 94F is normal (SP144).

When this is confirmed to be normal (SP144: YES), the channel adapter 7 outputs the ECC group number and page number correlated to the base volume BVVOL (SP135), and ends the read sorting processing (SP145).

On the other hand, when a fault is confirmed (SP144: NO), the channel adapter 7 outputs an invalid ECC group number (SP139), and the read sort processing ends in error (SP140).

Figure 28:
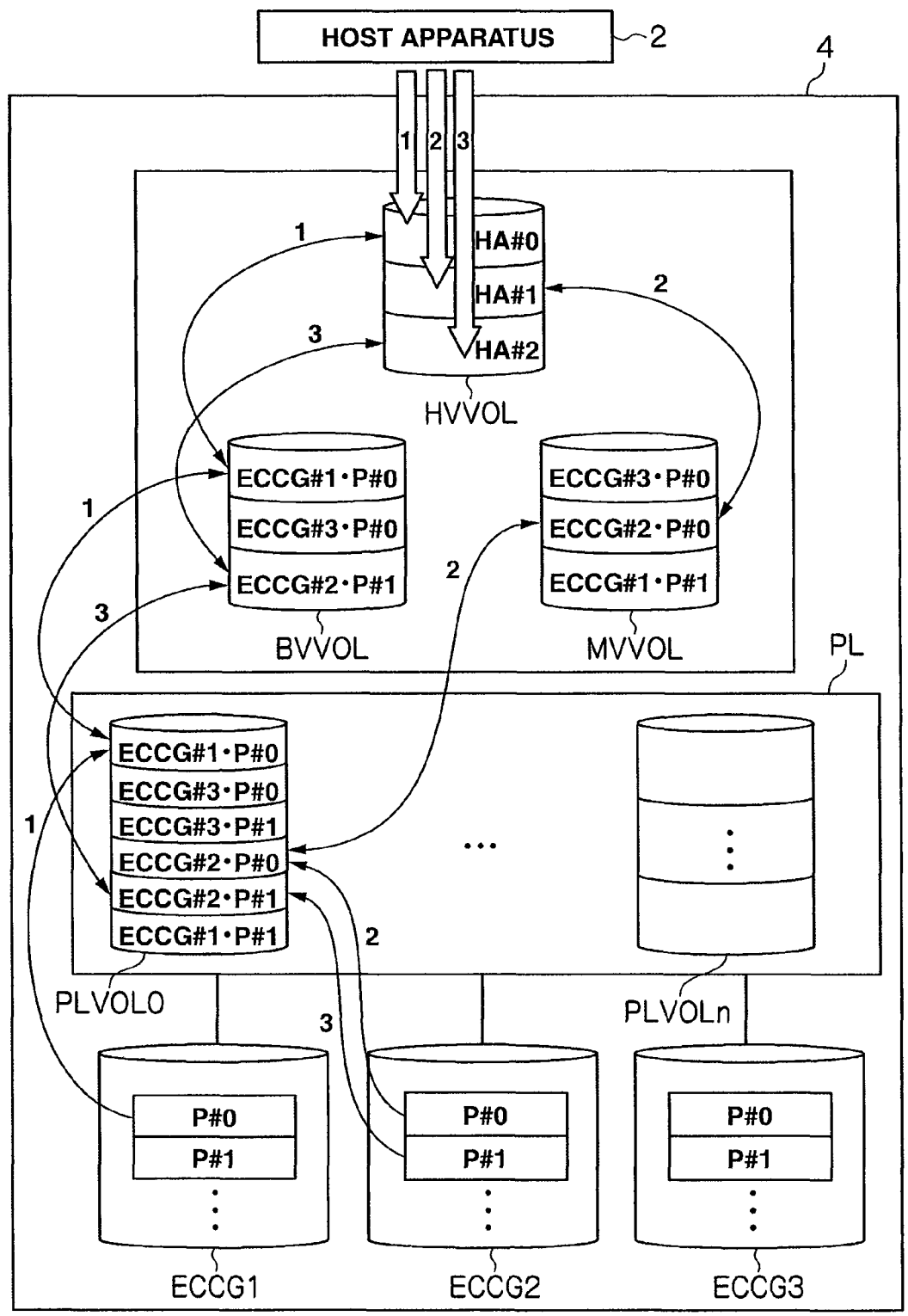
FIG. 28 is an outline view illustrating read sorting processing of a channel adapter of the first embodiment.

As shown in FIG. 28, an outline view is shown of the case where read sort processing is executed normally. When a host volume HVVOL is accessed as a result of a read request from the host apparatus 2, as a result of the read sorting processing, a first read request accesses a storage region of base volume BVVOL, a second read request accesses a storage region of mirror volume MVVOL, and a third read request accesses a storage region of the base volume BVVOL. In this way, storage regions of base volume BVVOL or mirror volume MVVOL are used alternately and it is possible to read out data requested based on consecutive read requests.

It is then possible to sort storage regions used by the base volume BVVOL and mirror volumes MVVOL correlated to the ECC group storing the requested data using page numbers converted from addresses instructed by the host apparatus 2 based on read requests from the host apparatus 2.

In the above, a description is given of the flow of a series of write processes and read processes occurring at the storage system 1 of this embodiment.

(1-2-3-11) Allocation Processing in the Case of Adding an ECC Group

Next, a description is given for the storage system 1 of this embodiment of a modified example of allocation processing allocating data stored within a certain ECC group to within an added ECC group in the event where the ECC group is added.

The disk adapter 11 executes this fault recovery processing based on the addition allocation program 115.

Figure 29:
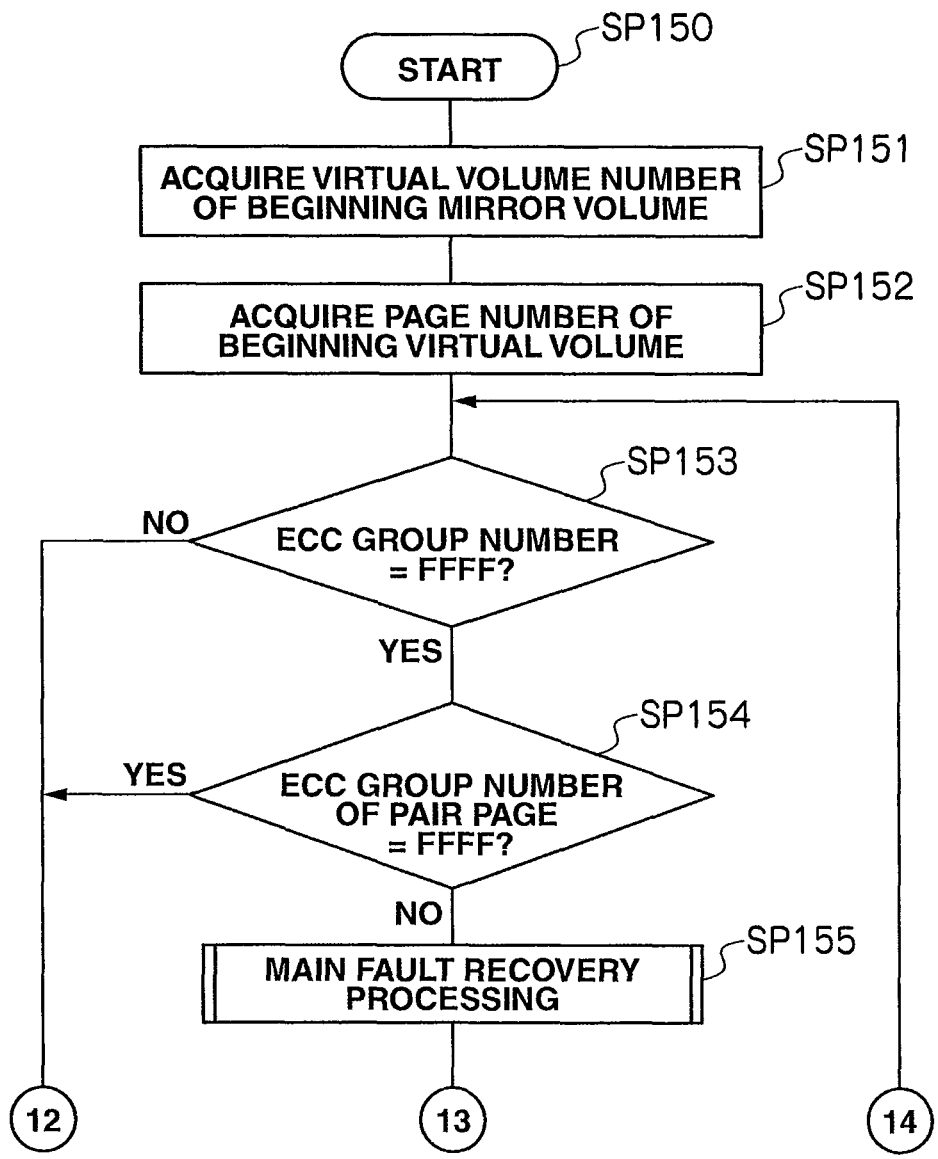
FIG. 29 is a flowchart showing addition allocation processing of a disk adapter of the first embodiment.
Figure 30:
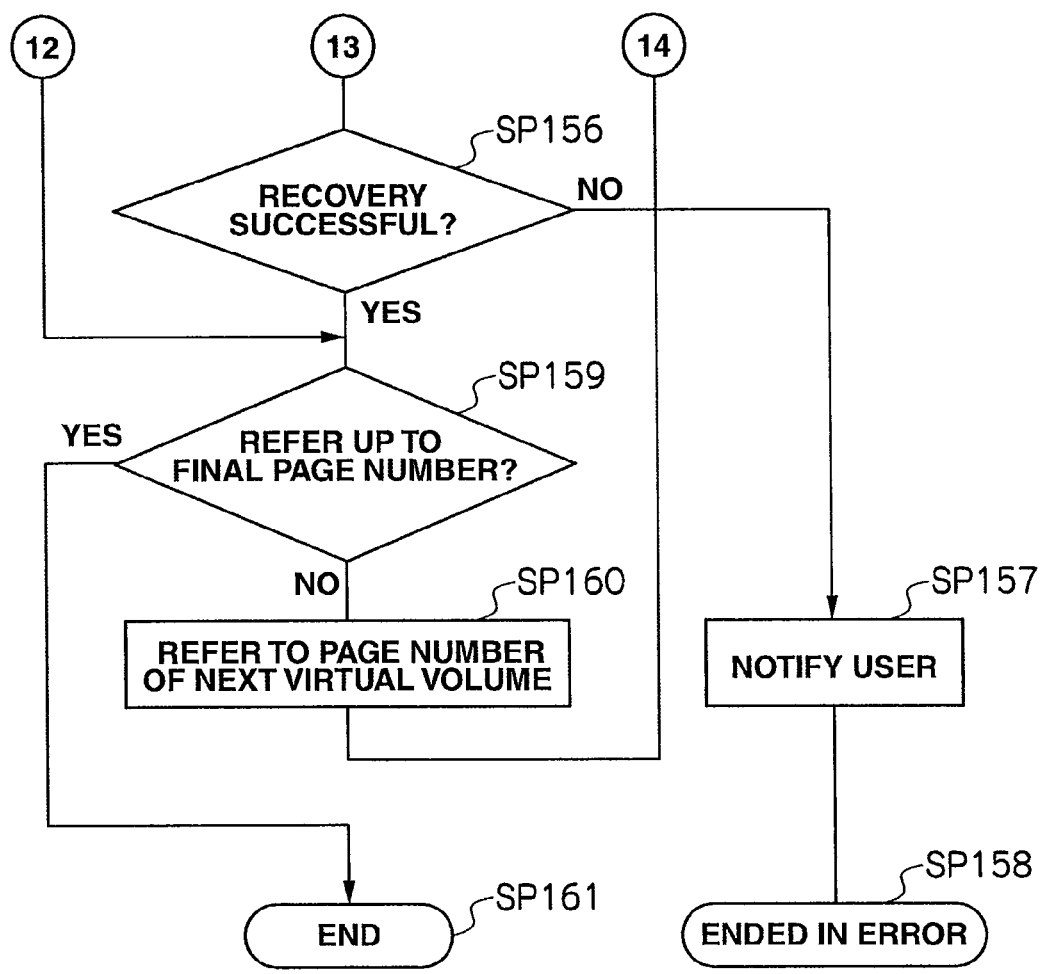
FIG. 30 is a further flowchart showing addition allocation processing of a disk adapter of the first embodiment.

In the event that the disk adapter 11 detects the number of the ECC group the fault has occurred for by executing the fault processing in step SP23, as shown in FIG. 29 and FIG. 30, the fault recovery processing is started (SP150).

Next, the disk adapter 11 refers to the host volume configuration information 90, and acquires a virtual volume number for the beginning mirror volume MVVOL (SP151). For example, the virtual volume number of the beginning mirror volume MVVOL is "2", as shown in the host volume configuration information 90 and the virtual volume and pool volume configuration information 91 of FIG. 31.

The disk adapter 11 then refers to the virtual volume configuration information 92 of the virtual volume number from the acquired virtual volume number, and acquires the beginning page number for the "page number" field 92A (SP152).

The disk adapter 11 then determines whether or not the ECC group number corresponding to the acquired page number is "FFFF" indicating no allocation or use as of yet (SP153).

When the disk adapter 11 determines that the ECC group number corresponding to the acquired page number is "FFFF" indicating no allocation or use as yet (SP153: NO), step SP159 is proceeded to, and processing is executed for the next page number.

Figure 31:
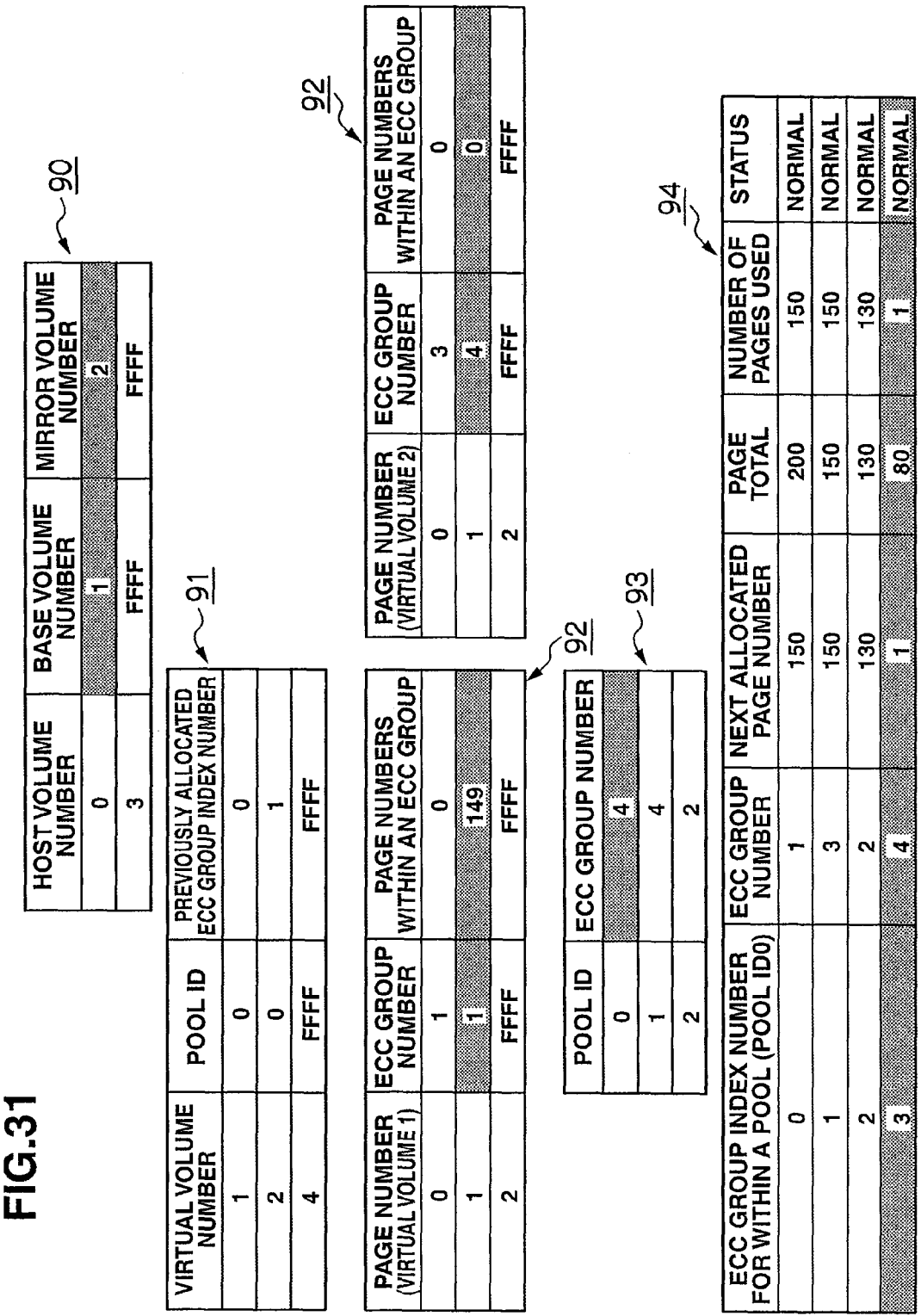
FIG. 31 is a schematic view of various configuration information illustrating addition allocation processing of a disk adapter of the first embodiment.

On the other hand, when the disk adapter 11 determines that the ECC group number corresponding to the acquired page number is not "FFFF" indicating no allocation or use as of yet (SP153: YES), it is determined whether or not the number of the ECC group the page number constituting a mirror configuration with the acquired page number belongs to is "FFFF" (SP154). For example, as shown in FIG. 31, when the virtual volume configuration information 92 of virtual volume number "2" is referred to, the page number that is "FFFF" is "2". That constituting a pair with page number "1" of the virtual volume can be understood to be page number "1" of virtual volume number "1" by referring to the host volume configuration information 90 and the virtual volume configuration information 92. The page number 1 of virtual volume 1 can be understood to correlate to page P149 of ECC group 1.

When the disk adapter 11 determines that the ECC group number the page number constituting a mirror configuration with the acquired page number belongs to is "FFFF" (SP154: YES), step SP159 is proceeded to, and processing is executed for the next page number.

Figure 32:
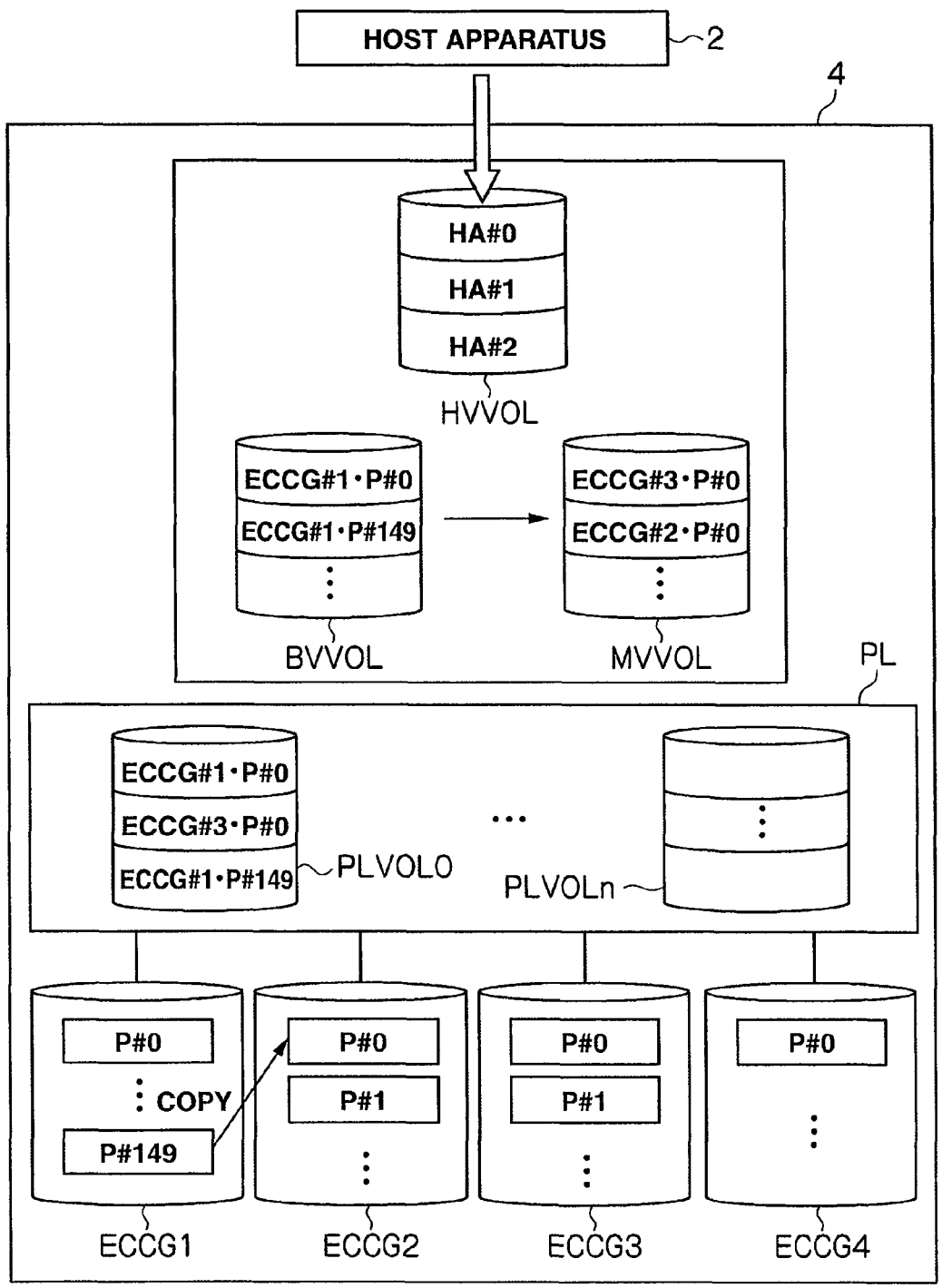
FIG. 32 is an outline view illustrating addition allocation processing of a disk adapter of the first embodiment.

When the disk adapter 11 determines that the ECC group number the page number constituting a mirror configuration with the acquired page number belongs to is not "FFFF" (SP154: NO), the main fault recovery processing is executed (SP155). The disk adapter 11 then copies the data to the ECC group added in the processing procedure for step SP100 to SP108 for the ECC group number the page number constituting a mirror configuration with the acquired page number belongs to. For example, as shown in FIG. 32, data stored in the page P149 of the ECC group 1 correlated to a storage region of the base volume is copied to page P0 of the EGG group 4. Then, as shown in FIG. 31, the "ECC group number" field 92B corresponding to "page" number 1 of the virtual volume configuration information 92 for virtual volume number "2" is updated to "4" and the "page numbers within an ECC group" field 92C is updated to "0". Further, "ECC number" 93B field of the pool volume configuration information 93 is updated from "3" to "4". Moreover, "3" is added to the "ECC group index number for within a pool" field 94A of the page configuration information 94.

The disk adapter 11 then determines whether or not recovery of data stored in the ECC group is successful based on this main fault recovery process (SP156). When the disk adapter 11 determines that there is a fault in recovery (SP156: NO), the user is notified of this (SP157), and this fault recovery processing ends in error (SP158).

On the other hand, in the event that the disk adapter 11 determines that data recovery is successful (SP156: YES), the disk adapter 11 determines whether or not to refer as for as the final page number at the virtual volume configuration information 92 corresponding to the virtual volume number of the mirror volume MVVOL (SP159).

When the disk adapter 11 determines that as far as the final page number is not referred to (SP159: NO), the disk adapter 11 refers to the page number of the next virtual volume (SP160), and the processing procedure of step SP153 is carried out again.

When the disk adapter 11 determines that as far as the final page number is referred to (SP159: YES), the fault recovery process ends (SP161).

As described above, it is also possible to save the same data on pages within different ECC groups in cases where an ECC group is added.

(1-3) Effects of the First Embodiment

As described above, it is possible to allocate storage regions within an ECC group based on write requests from host apparatus by utilizing an AOU function. Because of this, it is possible to save the same data in different ECC groups at base volumes and mirror volumes that constitute a mirror configuration and the reliability and fault tolerance of hard disks saving data can therefore be improved.

(2) Second Embodiment

Next, a storage system of a second embodiment is described in the following. In the second embodiment, aspects of the configuration that are the same as for the first embodiment are given the same numerals. Only aspects of the configuration that are different to the first embodiment are described in the description of the second embodiment.

(2-1) Physical and Logical Configuration of Storage System

Figure 33:
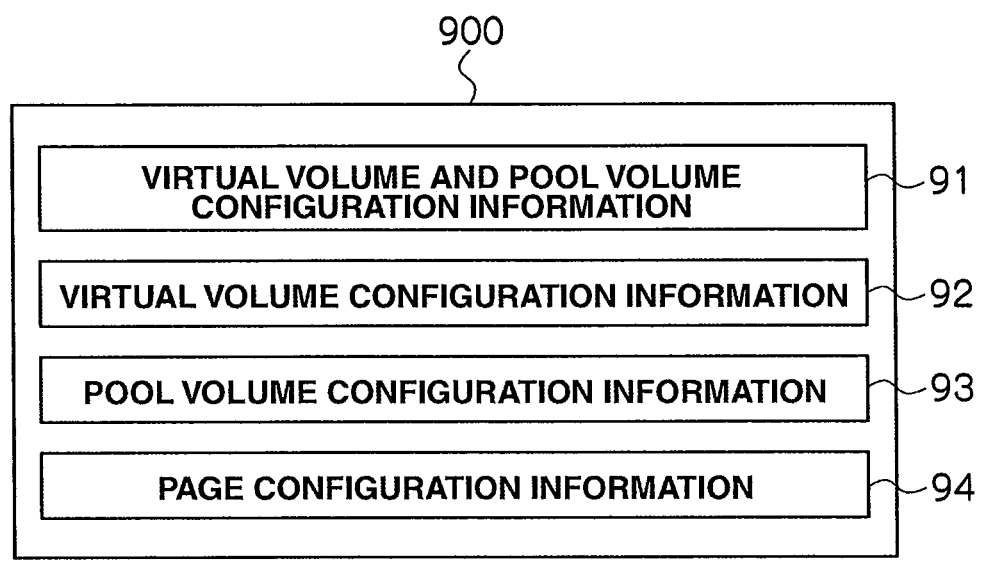
FIG. 33 is a schematic showing in shared memory of a second embodiment.

As shown in FIG. 33, shared memory 900 of a storage system 200 of the second embodiment is comprised of virtual volume and pool volume configuration information 91, virtual volume configuration information 92, pool volume configuration information 93, and page configuration information 94.

Figure 34:
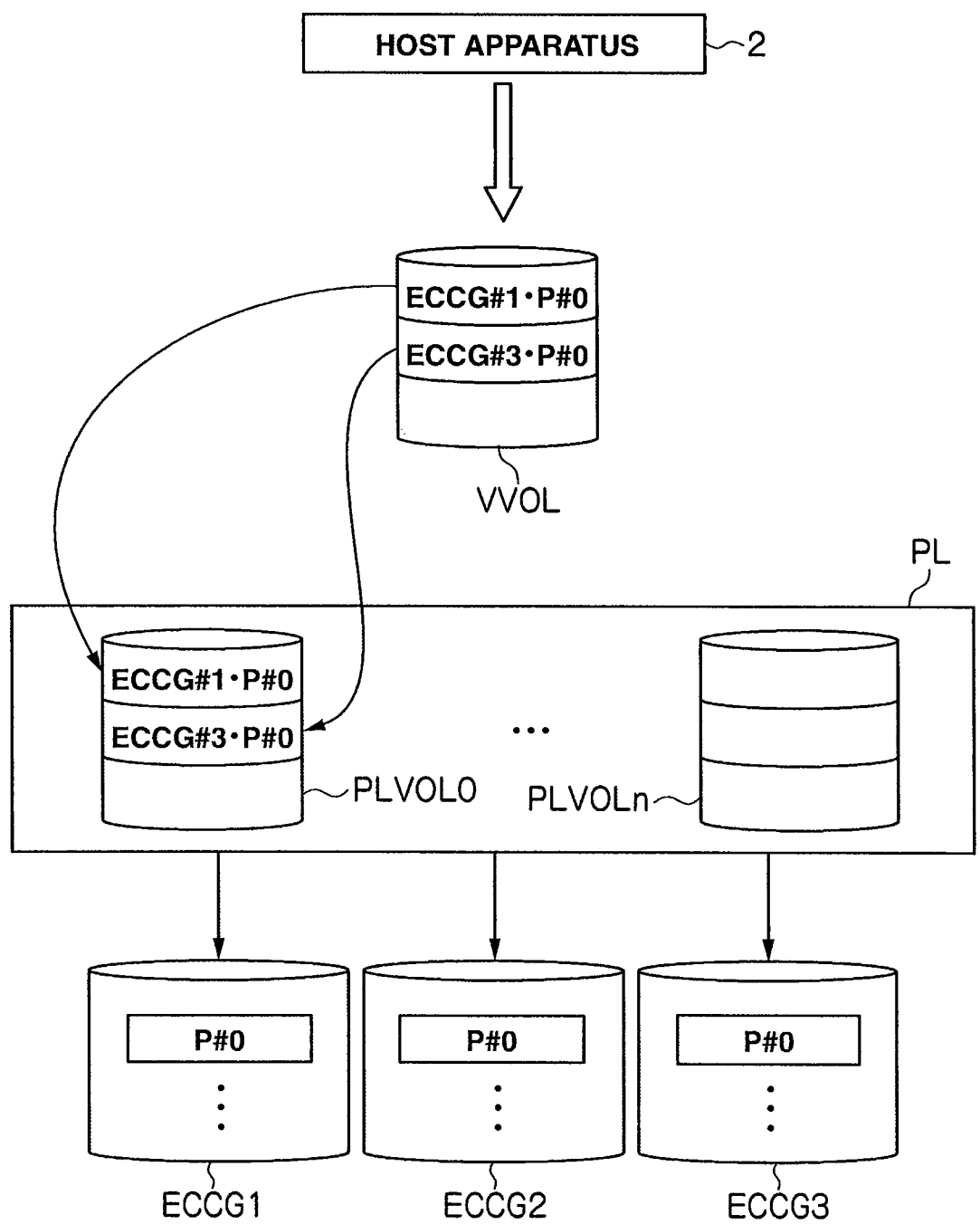
FIG. 34 is an outline view showing a logical configuration for a storage system of the second embodiment.

As shown in FIG. 34, with the logical configuration of the storage system 200 of the second embodiment, one pool region is configured from three ECC groups PL3 but a pool region PL may be configured from one or a plurality of ECC groups.

A plurality of pool volumes PLVOL may also form one pool region PL. A pool volume PLVOL may be dynamically allocated with a storage region of the hard disks 50 so as to supply a virtual volume VVOL. Minimum storage regions referred to as pages P that can be allocated with an ECC group are correlated at storage regions of the virtual volume.

(2-2) Distributed Storage Function and AOU Function of Storage System

Next, a description is given of a distributed storage function and AOU function mounted on the storage apparatus 4 within the storage system 1. The feature of the storage system 200 of this embodiment is that consecutive data from the host apparatus 2 can be distributed at storage locations in such a manner as to be stored at storage regions other than for the page of the ECC group storing data the previous time based on write requests from the host apparatus 2. For example, this refers to a function where, in the event that there is consecutive data 1 to data 3, when data 1 is stored in page P9 of ECC group 1, data 2 is stored in a page other than page P0 of ECC group 1, and data 3 is stored in a storage region other than the page P of the ECC group storing data 1 and data 2.

Further, an AOU function in this embodiment is a function of dynamically allocating virtual volumes VVOL recognized by the host apparatus 2 from the pool region PL (pool volume PLVOL).

(2-2-1) Write Processing at Channel Adapter

A description is now given of write processing for within the channel adapter 7 based on write requests from the host apparatus 2. This write processing is executed by the channel adapter 7 based on the channel adapter write program 70.

Figure 35:
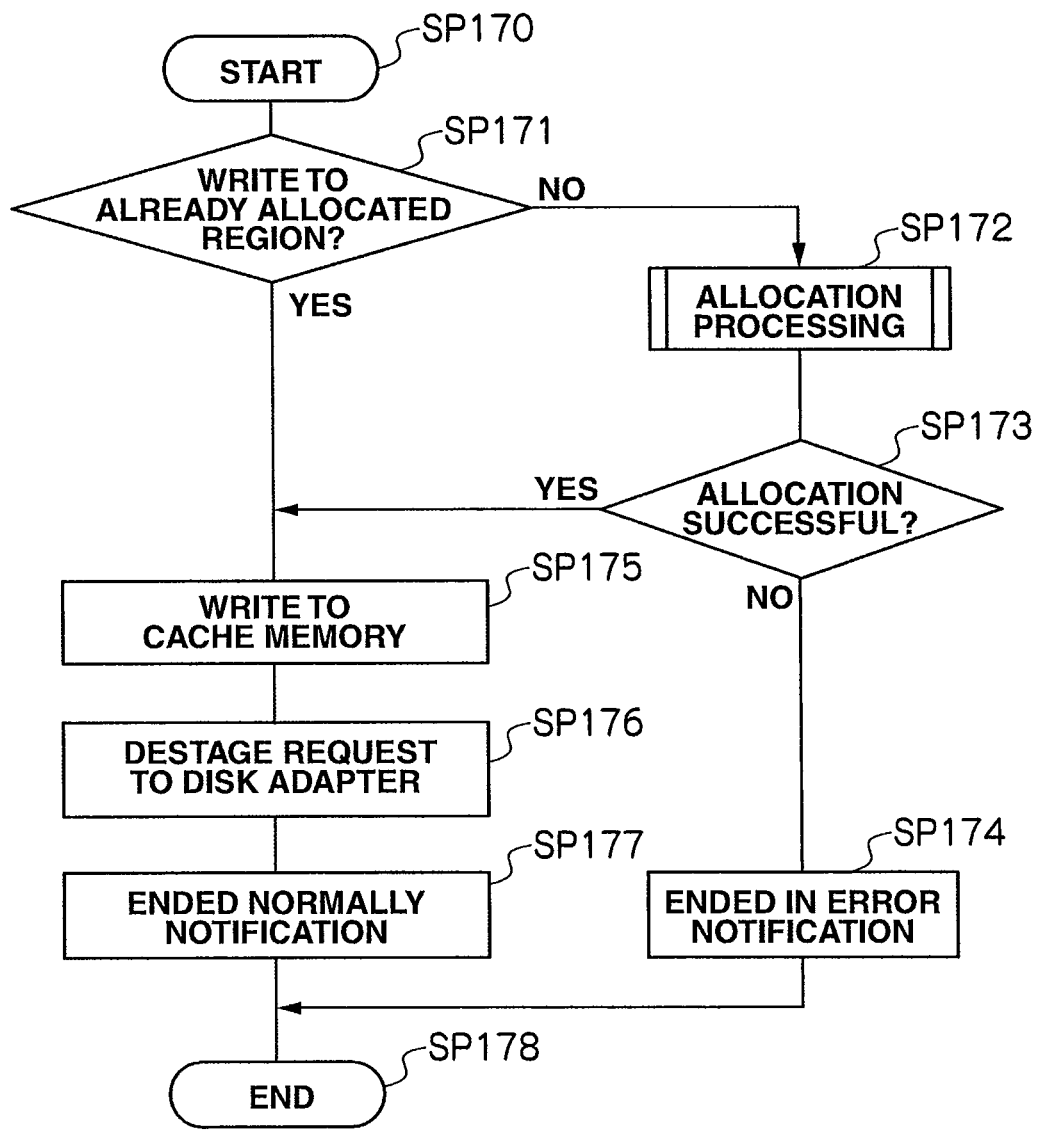
FIG. 35 is a flowchart showing write processing of a channel adapter of the second embodiment.

Specifically, as shown in FIG. 35, this processing is started by the channel adapter 7 receiving a write request from the host apparatus 2 (SP170).

Next, the channel adapter 7 determines whether or not a storage location for the data is a virtual volume VVOL allocated and correlated in page units to a storage region within an ECC group based on the write request from the host apparatus 2 (SP171). Specifically, the channel adapter 7 refers to certain virtual volume configuration information 92 within the shared memory 9 and determines whether or not a page number within an ECC group correlated to the volume number of the virtual volume VVOL is allocated.

When the channel adapter 7 determines that the storage region within the ECC group correlated to the volume number of the virtual volume VVVOL is as yet unallocated (SP171: NO), allocation processing is started (SP172). The details of this allocation processing executed by the channel adapter 7 are described in the following.

When the allocation processing is complete, the channel adapter 7 determines whether or not a storage region within the ECC group correlating to the volume number of virtual volume VVOL is allocated using page units (SP173).

When the channel adapter 7 determines that allocation of the storage region within the ECC group in page units has failed (SP173: NO), the write process ends in error (SP174), the host apparatus 2 is notified, and the processing ends (SP175). However, when it is determined that allocation in page units is successful (SP173: YES), processing of step SP175 is carried out.

On the other hand, in step SP171, when channel adapter 7 determines that allocation of the storage regions within the ECC group is already complete (SP171: YES), data from the host apparatus 2 is temporarily written to the cache memory 10 (SP175).

The channel adapter 7 the carries out a destage request to the disk adapter 11 in such a manner that data of the virtual volume VVOL within the cache memory 10 is destaged to a page number within an ECC group correlating to the virtual volume VVOL (SP176).

The channel adapter 7 then notifies the host apparatus 2 that the write processing has finished normal (SP177), and the processing is complete (SP178).

(2-2-2) Write Processing at Disk Adapter

A description is now given of write processing within disk adapter 11 based on a write request from the host apparatus 2. This write processing is executed by the channel adapter 11 based on the disk adapter write program 110.

Figure 36:
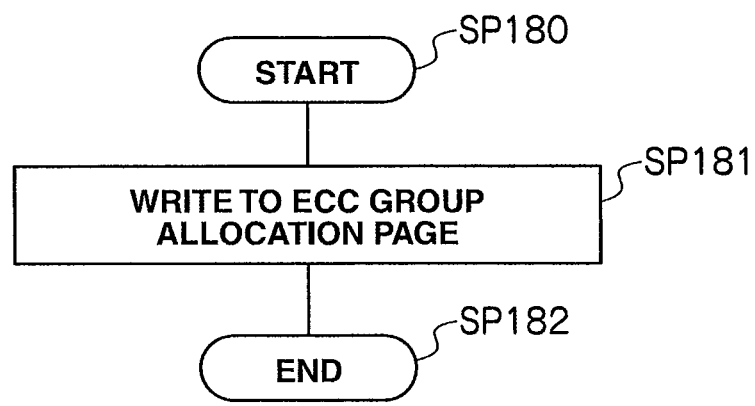
FIG. 36 is a flowchart showing write processing of a disk adapter of the second embodiment.

Specifically, as shown in FIG. 36, this processing is started by the disk adapter 11 receiving a destage request from the channel adapter 7 (SP180).

The disk adapter 11 then writes data from the host apparatus 2 to the page P allocated within the ECC group (SP181), and this process is complete (SP182).

(2-2-3) Allocation Processing at Channel Adapter

Here, in step SP172, a specific description is given of the manner in which the channel adapter 7 carries out allocation deciding processing. This allocation deciding processing is executed by channel adapter 7 based on the allocation deciding program 72.

Figure 37:
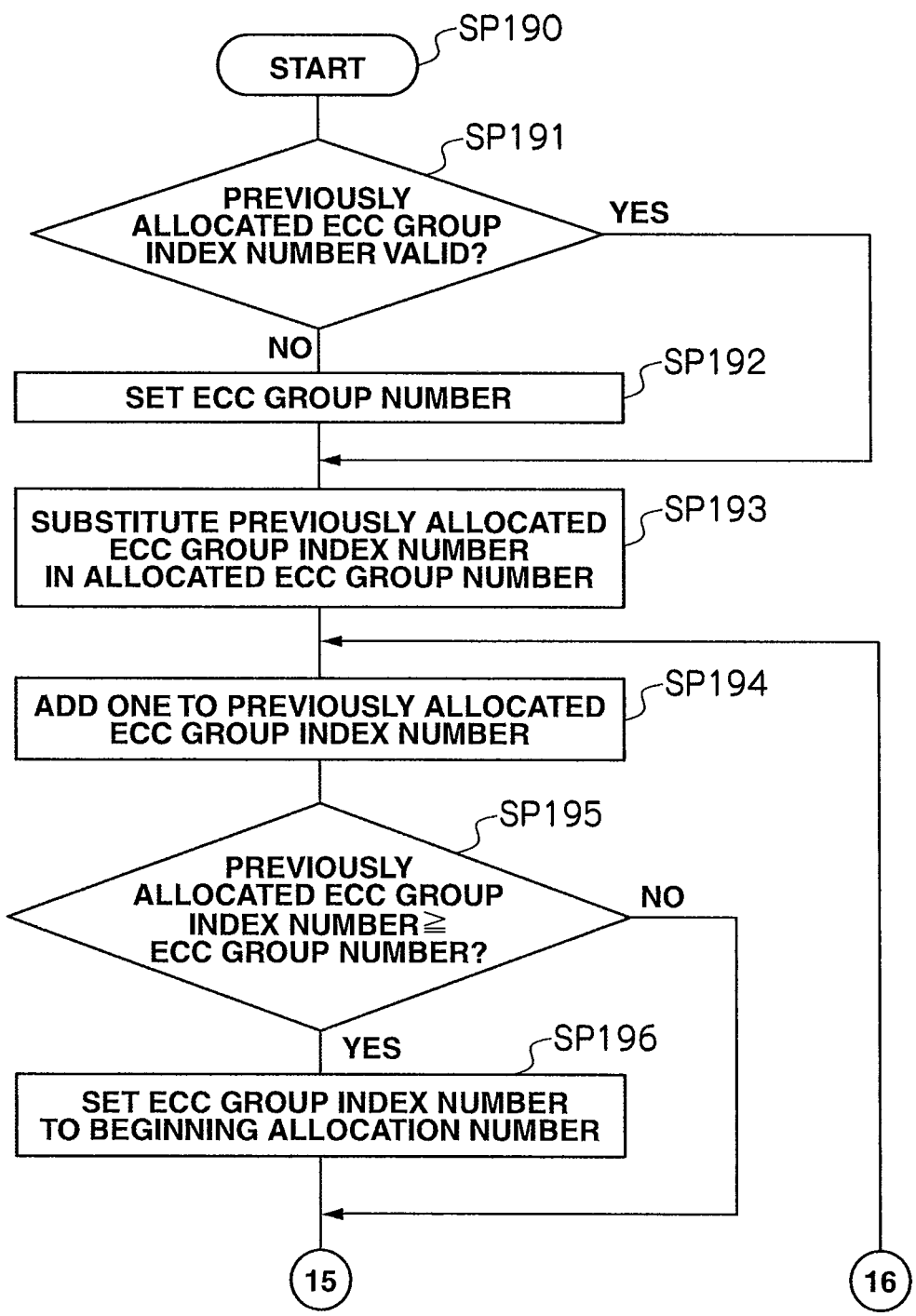
FIG. 37 is a further flowchart showing allocation and deciding processing of a channel adapter of the second embodiment.
Figure 38:
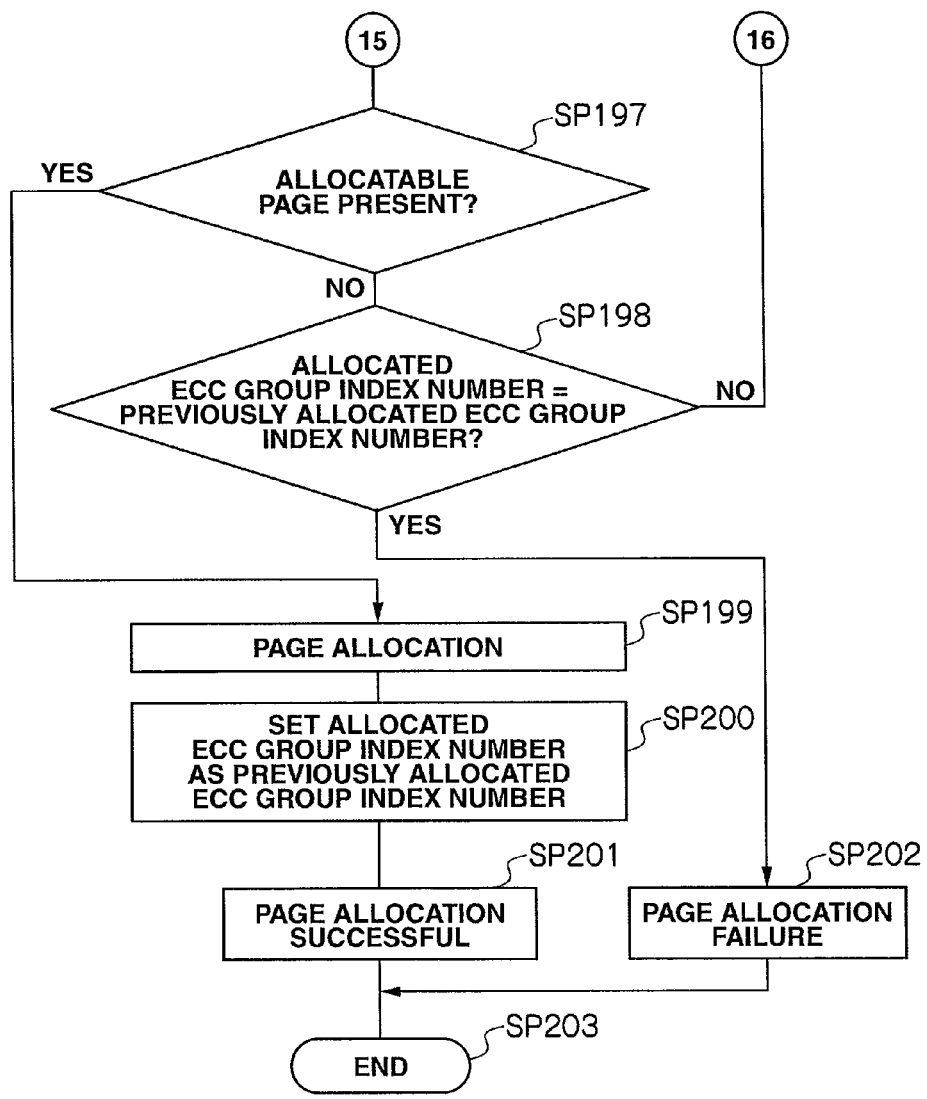
FIG. 38 is another flowchart showing allocation and deciding processing of a channel adapter of the second embodiment.

As shown in FIG. 37 and FIG. 38, in the event that the channel adapter 7 determines that the page P within the ECC group corresponding to the virtual volume VVOL is not yet allocated to the VVOL storage region of the virtual volume (SP1: NO), allocation deciding processing is started to allocate the storage region of the base volume BVVOL and the page P within the ECC group (SP190).

The channel adapter 7 carries out the same processing procedure for SP50 to SP57 as the processing of step SP191 to SP197 for the virtual volume VVOL.

The channel adapter 7 then refers to the total number of pages for the ECC group corresponding to the ECC group index number allocated this time that is the beginning number and the number of pages used, and when it is determined that allocatable pages are present (SP197: YES), the channel adapter 7 allocates page P (SP199).

After allocating page P, the channel adapter 7 sets the ECC group index number allocated this time as the previously allocated ECC group index number (SP200), allocation of the page P is successful (SP201), and this processing is complete (SP203).

On the other hand, in step SP197, when the channel adapter 7 determines that a page capable of allocation is not present (SP197: NO), the channel adapter 7 determines whether or not the ECC group index number allocated this time is the ECC group index number allocated the previous time (SP198).

In the event that the channel adapter 7 determines that the ECC group index number allocated this time is the ECC group index number allocated the previous time (SP198: YES), allocation of the page P fails because the ECC group is already allocated (SP202), and this processing ends (SP203).

On the other hand, when the channel adapter 7 determines that the ECC group index number allocated this time is not the ECC group index number allocated the previous time (SP198: NO), step SP194 is returned to, and processing is continued for the index number of the next ECC group.

(2-3) Effects of the Second Embodiment

As described above, it is possible to allocate storage regions within an ECC group based on write requests from host apparatus by utilizing an AOU function.

Because of this, at the storage regions of the virtual volume, it is possible to store consecutive data in a distributed manner correlated with pages of ECC groups other than the pages of ECC groups storing on the previous occasion, and the throughput performance of the hard disk saving the data can therefore be improved.

(3) Third Embodiment

Next, a storage system of a third embodiment is described in the following. In the third embodiment, aspects of the configuration that are the same as for the first embodiment are given the same numerals. Only aspects of the configuration that are different to the first embodiment are described in the description of the third embodiment.

(3-1) Physical and Logical Configuration of Storage System

Figure 39:
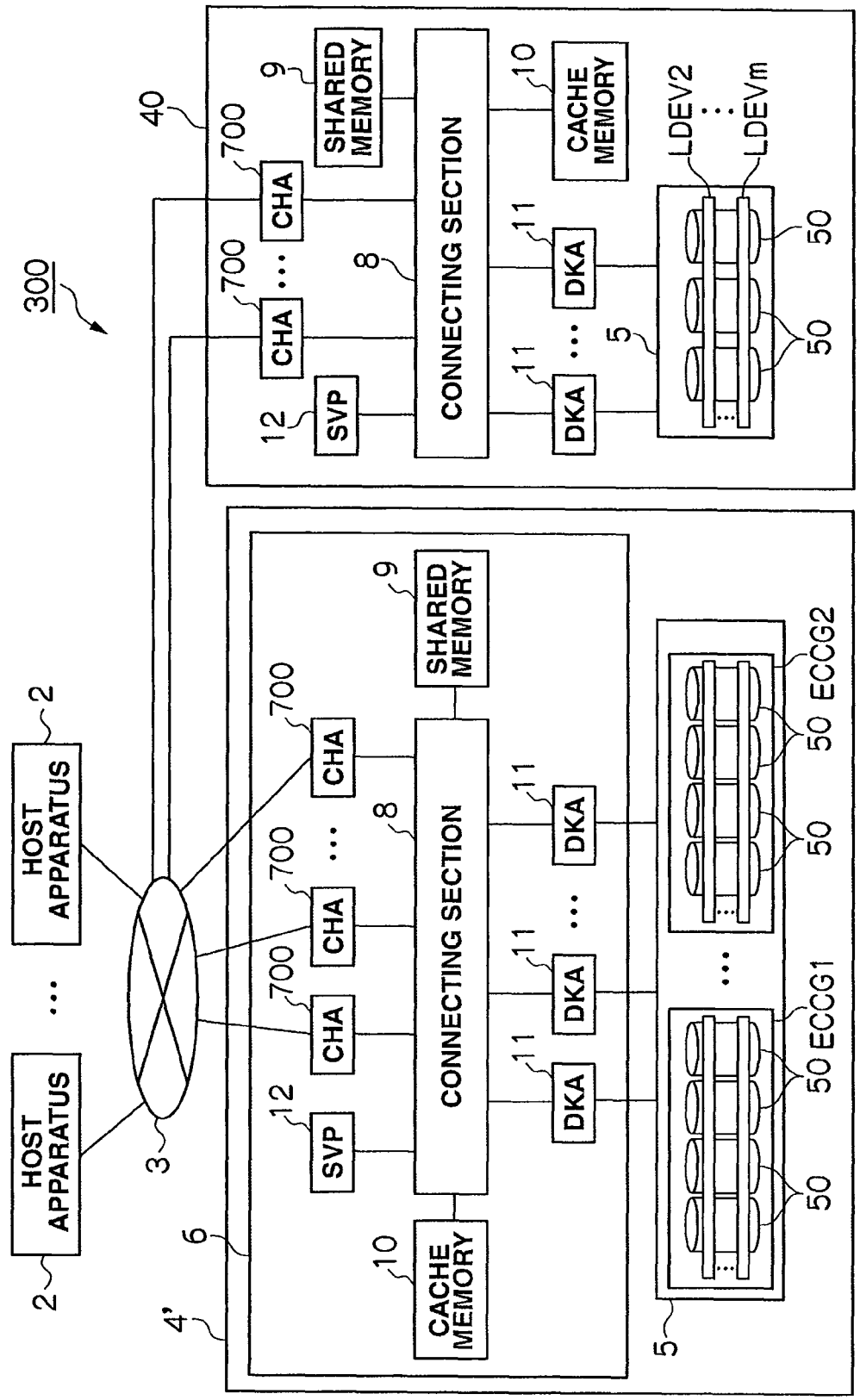
FIG. 39 is a block view showing an overall configuration for a storage system of a third embodiment.

As shown in FIG. 39, first storage apparatus 4' of a storage system 300 of the third embodiment has a different configuration to the configuration of the channel adapter 7 of the storage apparatus 4 of the storage system 1 of the first embodiment. In addition to the first storage apparatus 4', the storage system 300 is configured with second storage apparatus 40 connected via the network 3.

Figure 40:
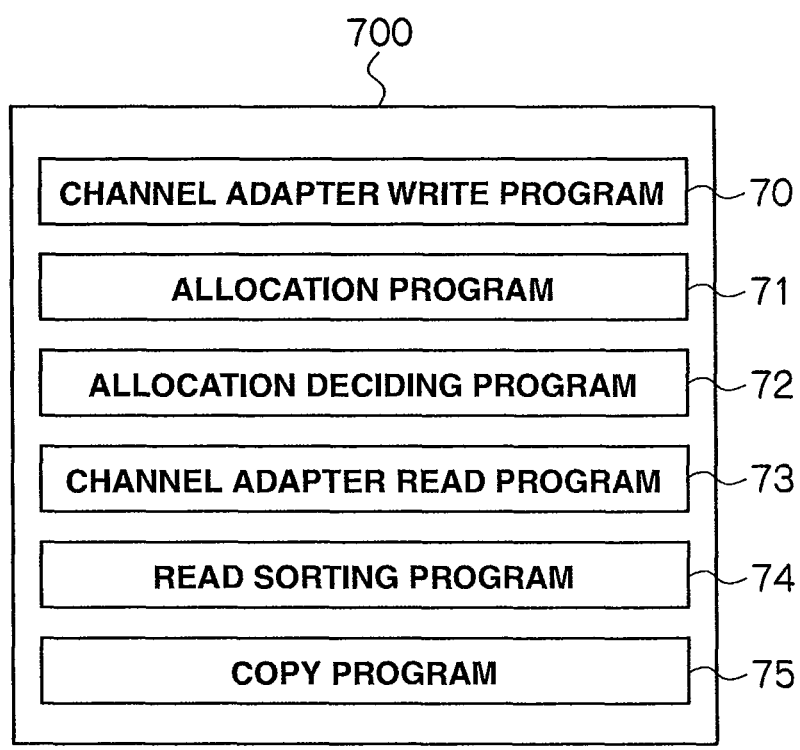
FIG. 40 is a schematic showing in a channel adapter of the third embodiment.

Then, as shown in FIG. 40, within the channel adapter 700, in addition to the various programs 70 to 74 described in the first embodiment, a copy program 75 is provided for copying data of the hard disks 50 to other hard disks.

Figure 41:
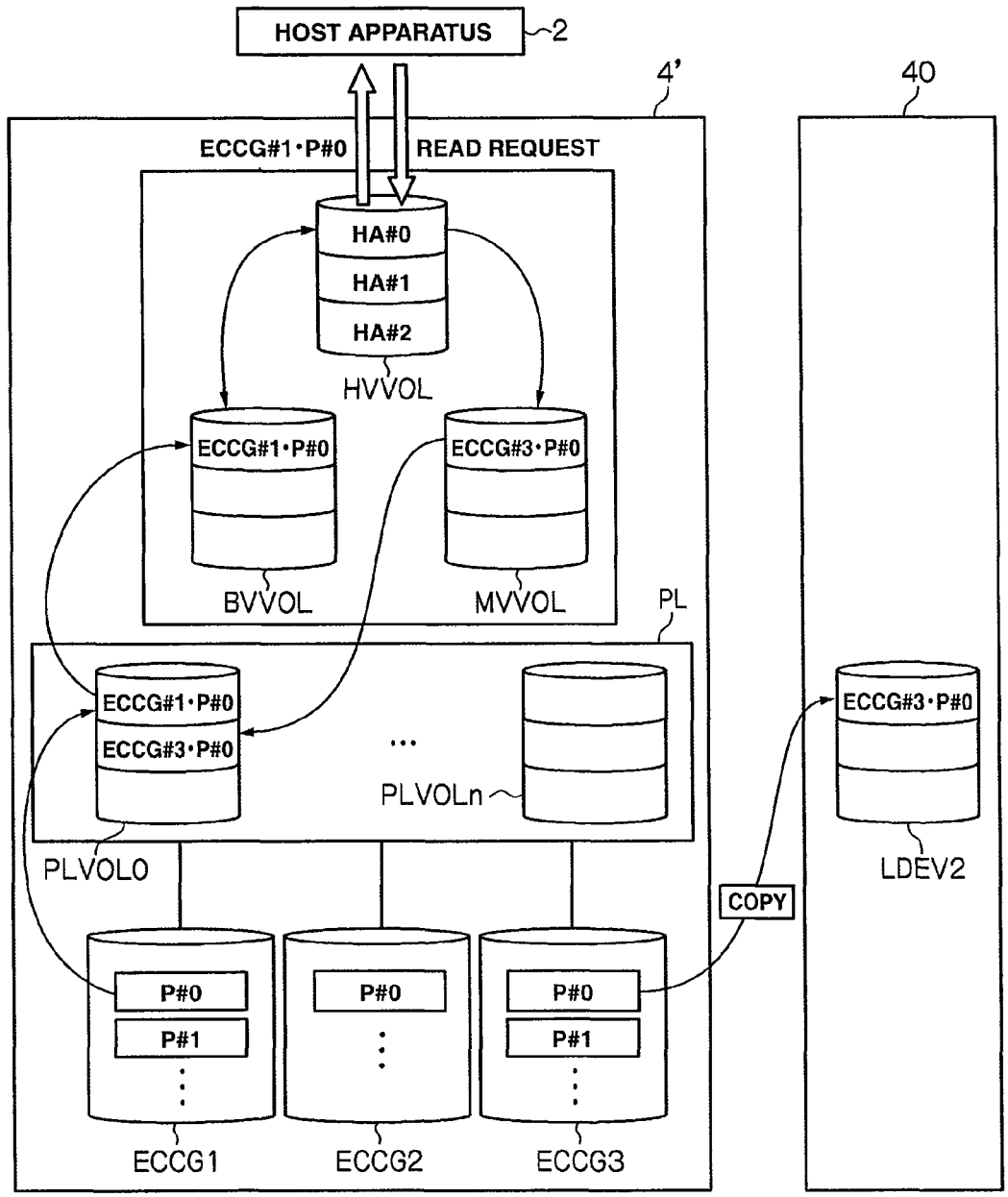
FIG. 41 is an outline view showing a logical configuration for a storage system of the third embodiment.

In addition, as shown in FIG. 41, the logical configuration of the storage system 300 of this embodiment is such that, of the logical volumes LDEV2 to LDEVm formed on the storage regions of the plurality of hard disks at the second storage apparatus 40, the logical volume LDEV2 is shown at the logical configuration for FIG. 4 in the first embodiment.

(3-2) Copy Processing at Channel Adapter

A detailed description is now given of copy processing to back up data saved within the ECC group of the first storage apparatus 4' to the logical volume LDEV2 of the second storage apparatus 40 at the same time as reading out data saved within the ECC group of the first storage apparatus 4' based on a read request from the host apparatus 2. This copy processing is executed by channel adapter 7 based on the copy program 75.

Figure 42:
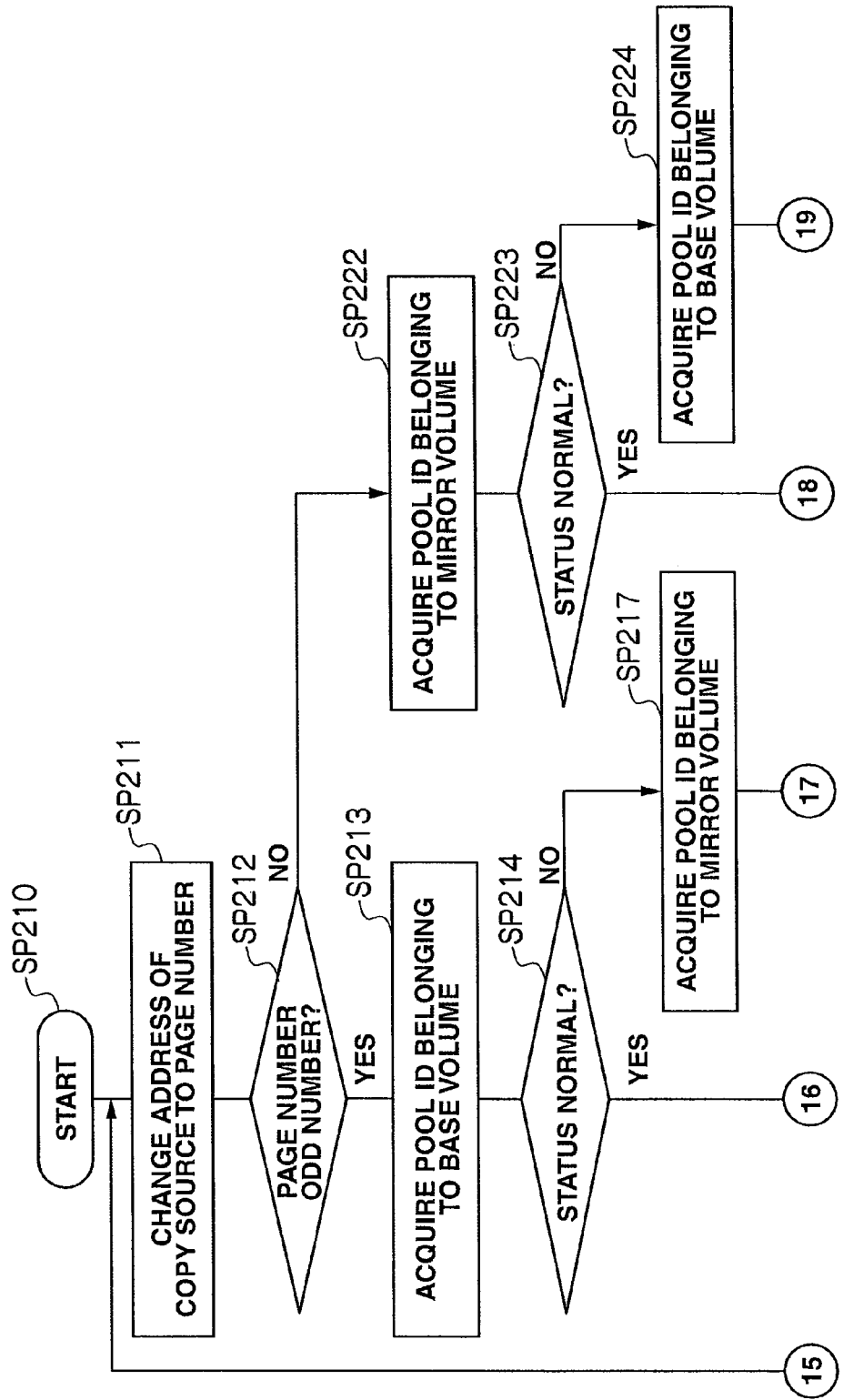
FIG. 42 is a flowchart showing copy processing of a channel adapter of the third embodiment.
Figure 43:
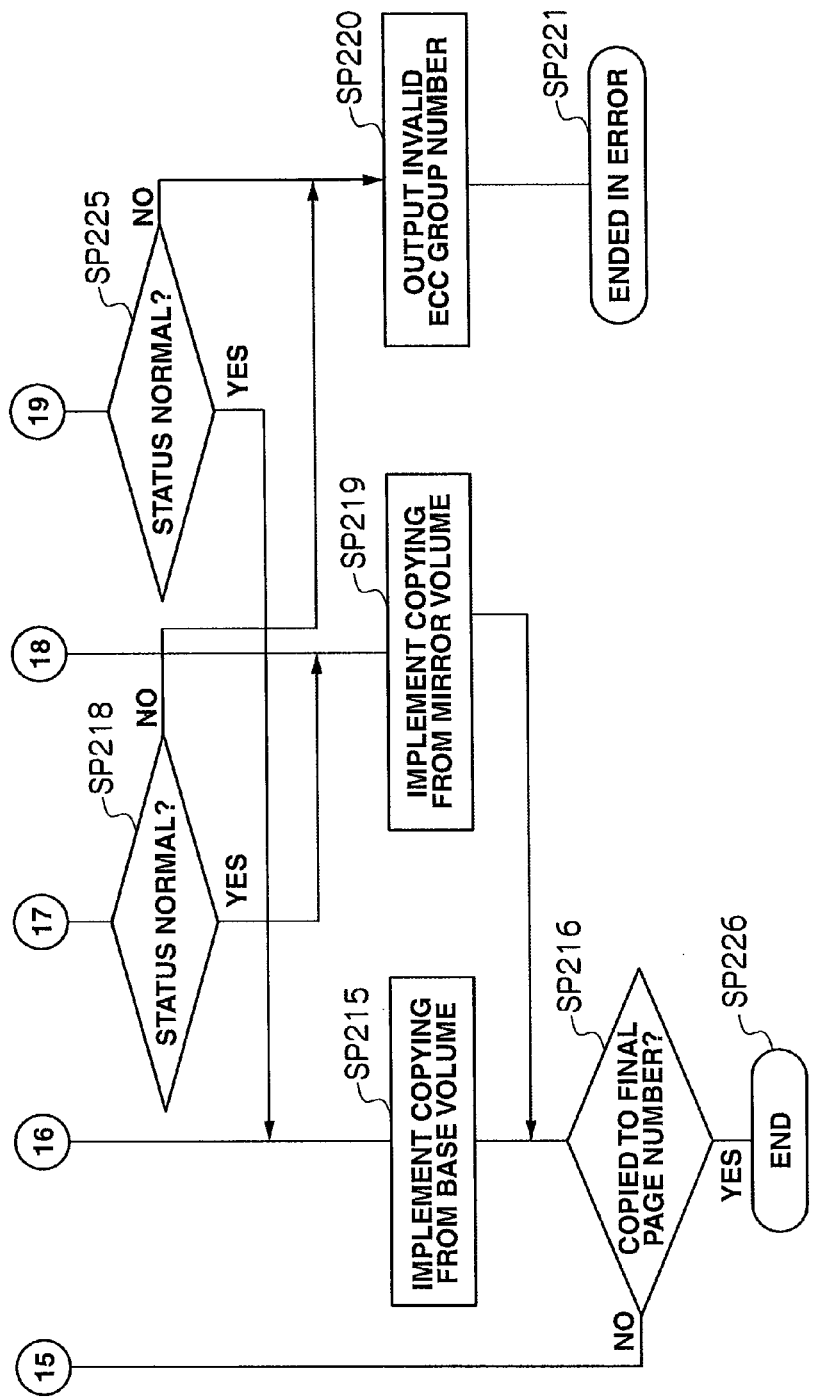
FIG. 43 is a flowchart showing copy processing of a channel adapter of the third embodiment.

Specifically, as shown in FIG. 42 and FIG. 43, the channel adapter 700 starts copy processing when there is a read request from the host apparatus 2 (SP210).

Next, the channel adapter 700 converts the address of the copy source designated by the host apparatus 2 using a read request to a page number (SP211), and determines whether or not the converted page number is an odd number (SP212).

When the page number is an odd number (SP212: YES), the channel adapter 700 refers to the virtual volume and pool volume configuration information 91, and acquires the pool ID correlating to the base volume BVVOL (SP213).

The channel adapter 700 acquiring the pool ID correlated to the base volume BVVOL then refers to the page configuration information 94 in the possession of the pool ID number, and confirms whether or not the "status" field 94F is normal (SP214).

In the event that this is configured to be normal (SP214: YES), the channel adapter 700 implements copying from base volume BVVOL to the logical volume LDEV2 within the second storage apparatus 40 (SP215).

The channel adapter 700 then determines whether or not to implement copying as far as the final page number (SP216), and when it is determined not to implement copying as far as the final page number (SP216: NO), step SP211 is again returned to, and copying is implemented for the next page number.

On the other hand, when the channel adapter 700 determines that copying is implemented as far as the final page number (SP216: YES), this processing ends (SP226).

In step SP214, when a fault is confirmed (SP214: NO), the channel adapter 700 refers to the virtual volume and pool volume configuration information 91, and acquires the pool ID correlating to the mirror volume MVVOL (SP217).

The channel adapter 700 acquiring the pool ID correlated to the mirror volume MVVOL then refers to the page configuration information 94 in the possession of the pool ID number, and confirms whether or not the "status" field 94F is normal (SP218).

In the event that this is configured to be normal (SP218: YES), the channel adapter 700 implements copying from mirror volume MVVOL to the logical volume LDEV2 within the second storage apparatus 40 (SP219), and the processing of step SP216 is then implemented.

On the other hand, when a fault is confirmed (SP218: NO), the channel adapter 700 outputs an invalid ECC group number (SP220), and the copy processing ends in error (SP221).

In step SP212, when the page number is an even number (SP212: NO), the channel adapter 700 refers to the virtual volume and pool volume configuration information 91, and acquires the pool ID correlating to the mirror volume MVVOL (SP222).

The channel adapter 700 acquiring the pool ID correlated to the mirror volume MVVOL then refers to the page configuration information 94 in the possession of the pool ID number, and confirms whether or not the "status" field 94F is normal (SP223).

In the event that this is configured to be normal (SP223: YES), the channel adapter 700 implements copying from mirror volume MVVOL to the logical volume LDEV2 within the second storage apparatus 40 (SP219), and the processing of step SP216 is then implemented.

On the other hand, when a fault is confirmed (SP223: NO), the channel adapter 700 refers to the virtual volume and pool volume configuration information 91, and acquires the pool ID correlating to the base volume BVVOL (SP224).

The channel adapter 700 acquiring the pool ID correlated to the base volume BVVOL then refers to the page configuration information 94 in the possession of the pool ID number, and confirms whether or not the "status" field 94F is normal (SP225).

In the event that this is configured to be normal (SP225: YES), the channel adapter 700 implements copying from base volume BVVOL to the logical volume LDEV2 within the second storage apparatus 40 (SP215), and the processing of step SP216 is then implemented.

On the other hand, when a fault is confirmed (SP225: NO), the channel adapter 700 outputs an invalid ECC group number (SP220), and the copy processing ends in error (SP221).

(3-3) Effects of the Third Embodiment

In the above, as a result of utilizing an AOU function, it is possible to save the same data in different ECC groups at base volumes and mirror volumes that constitute a mirror configuration and the reliability and fault tolerance of hard disks saving data can therefore be improved.

Further, within one storage apparatus, it is possible to improve the system efficiency of the storage system because use is possible within one storage apparatus divided between ECC groups utilized in reading out based on read requests from a host, and ECC groups utilized in copying for backing up to another storage apparatus.

(4) Other Embodiments

The various processes described in the first to third embodiments are carried out by the channel adapter 7 and the disk adapter 11 but the various processing can be carried out by either of the channel adapter or the disk adapter 11 and are not limited to the subject described above.

Further, shared memory 9 is provided as first correlating section correlating a plurality of RAID groups (ECC groups) comprised of a plurality of physical disks (hard disks 50) and a pool region P and a second correlating section correlating the pool region PL and storage regions of the virtual volume VVOL but the first correlating section and the second correlating section may be configured from individual hardware.

A first allocating section allocating first data from the host apparatus 2 to pages P of a first storage region of the first RAID group based on write requests from the host apparatus 2 and a second allocation section allocating second data from the host apparatus in a distributed manner to storage regions of and of the RAID groups with the exception of pages P that are at the first storage region of the first RAID group allocated by the first allocation section are provided within the storage apparatus 4 but the first allocation section and the second allocation section may also be provided using separate hardware configurations.

Further, a first reading section for reading out first requested data from RAID group regions correlating storage regions of base volumes BVVOL and mirror volumes MVVOL and a second reading section for reading out second requested data from storage regions of RAID groups correlating storage regions with the exception of storage regions for base volumes BVVOL and mirror volumes MVVOL used by the first reading section are provided within the storage apparatus 4 but the first reading section and the second reading section may also be provided as separate hardware configurations.

The third allocating section is taken to be an logical volume LDEV2 within the second storage apparatus 50 but may also be provided at the first storage apparatus 4'.

The addition allocation section is provided within the storage apparatus 4 but may also be provided as a separate hardware configuration.

The present invention may be broadly applied to storage systems having one or a plurality of storage devices or to other embodiments of storage systems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system comprising:
a plurality of Redundant Array of Independent/Inexpensive Disks (RAID) groups created from a plurality of storage devices, the plurality of RAID groups including a first RAID group and a second RAID group;
a controller providing a host virtual volume to which a host computer sends read/write requests, the controller configured to:
manage a plurality of virtual volumes including a first virtual volume and a second virtual volume, the first virtual volume and the second virtual volume being a pair of mirror volumes related to the host virtual volume;
allocate at least one of a plurality of storage regions provided from the first RAID group to a first virtual storage region of the first virtual volume according to a first write request to the host virtual volume from the host computer;
allocate at least one of a plurality of storage regions provided from the second RAID group to a second virtual storage region of the second virtual volume according to the first write request, so that write data corresponding to the first virtual storage region and write data corresponding to the second virtual storage region are stored in the storage regions belongs to a different RAID group; and
allocate at least one of the plurality of storage regions provided from the second RAID group to a third virtual storage region of the first virtual volume.

2. The storage system according to claim 1, further comprising:
   a third RAID group of the plurality of RAID groups,
   wherein the controller is configured to allocate at least one of a plurality of storage regions provided from the third RAID group to the third virtual storage region of the first virtual volume according to a second write request to the host virtual volume from the host computer.

3. The storage system according to claim 1, wherein the controller is configured to allocate at least one of the plurality of storage regions provided from the first RAID group to a fourth virtual storage region of the first virtual volume according to a third write request to the host virtual volume from the host computer.

4. The storage system according to claim 1, wherein when the controller receives a read request to the host virtual volume from the host computer, the controller is configured to read data related to the read request from the first virtual volume and the second virtual volume alternately.

5. The storage system according to claim 1, further comprising:
   a third RAID group of the plurality of RAID groups,
   wherein when a failure occurs to the first RAID group, the controller is configured to copy data stored in the first storage region to a third storage region of the third RAID group, so that the write data corresponding to the first virtual storage region is stored in a different RAID group from the second RAID group.

6. A data management method for a storage system, the storage system comprising: a plurality of Redundant Array of Independent/Inexpensive Disks (RAID) groups created from a plurality of storage devices, the plurality of RAID groups including a first RAID group and a second RAID group; and a controller providing a host virtual volume to which a host computer sends read/write requests, the method comprising:
   managing, by the controller, a plurality of virtual volumes including a first virtual volume and a second virtual volume, the first virtual volume and the second virtual volume being a pair of mirror volumes related to the host virtual volume;
   allocating, by the controller, at least one of a plurality of storage regions provided from the first RAID group to a first virtual storage region of the first virtual volume according to a first write request to the host virtual volume from the host computer;
   allocating, by the controller, at least one of a plurality of storage regions provided from the second RAID group to a second virtual storage region of the second virtual volume according to the first write request, so that write data corresponding to the first virtual storage region and write data corresponding to the second virtual storage region are stored in the storage regions belongs to a different RAID group; and
   allocating at least one of the plurality of storage regions provided from the second RAID group to a third virtual storage region of the first virtual volume.

7. The data management method according to claim 6,
   wherein the storage system further comprises a third RAID group of the plurality of RAID groups, and
   wherein the method further comprises:
   allocating, by the controller, at least one of a plurality of storage regions provided from the third RAID group to the third virtual storage region of the first virtual volume according to a second write request to the host virtual volume from the host computer.

8. The data management method according to claim 6, further comprising:
   allocating, by the controller, at least one of the plurality of storage regions provided from the first RAID group to a fourth virtual storage region of the first virtual volume according to a third write request to the host virtual volume from the host computer.

9. The data management method according to claim 6, further comprising:
   when the controller receives a read request to the host virtual volume from the host computer, reading, by the controller, data related to the read request from the first virtual volume and the second virtual volume alternately.

10. The data management method according to claim 6,
   wherein the storage system further comprises a third RAID group of the plurality of RAID groups, and
   wherein the method further comprises:
   when a failure occurs to the first RAID group, copying, by the controller, data stored in the first storage region to a third storage region of the third RAID group, so that the write data corresponding to the first virtual storage region is stored in a different RAID group from the second RAID group.

* * * * *